United States Patent
Kalapatapu et al.

(10) Patent No.: US 9,602,959 B2
(45) Date of Patent: Mar. 21, 2017

(54) COMMUNICATION SYSTEM HAVING RELAY ARCHITECTURE

(71) Applicant: Avago Technologies General IP (Singapore) Pte. Ltd., Singapore (SG)

(72) Inventors: Dutt Kalapatapu, Santa Clara, CA (US); Florin Baboescu, San Diego, CA (US); Vojislav Vucetic, Holmdel, NJ (US); Kamesh Medapalli, San Jose, CA (US)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 107 days.

(21) Appl. No.: 14/321,567

(22) Filed: Jul. 1, 2014

(65) Prior Publication Data
US 2015/0009908 A1 Jan. 8, 2015

Related U.S. Application Data

(60) Provisional application No. 61/842,898, filed on Jul. 3, 2013, provisional application No. 61/951,358, filed on Mar. 11, 2014.

(51) Int. Cl.
| | |
|---|---|
| *H04W 4/02* | (2009.01) |
| *H04L 12/00* | (2006.01) |
| *H04L 12/64* | (2006.01) |
| *H04W 40/00* | (2009.01) |

(52) U.S. Cl.
CPC .............. *H04W 4/02* (2013.01); *H04L 12/00* (2013.01); *H04L 12/6418* (2013.01); *H04W 40/00* (2013.01)

(58) Field of Classification Search
None
See application file for complete search history.

(56) References Cited

U.S. PATENT DOCUMENTS

| | | | | |
|---|---|---|---|---|
| 2013/0303088 A1* | 11/2013 | Watfa | .................... | H04W 4/008 455/41.2 |
| 2014/0192739 A1* | 7/2014 | Liao | ...................... | H04W 4/023 370/329 |

(Continued)

*Primary Examiner* — Jay P Patel
(74) *Attorney, Agent, or Firm* — Sterne, Kessler, Goldstein & Fox P.L.L.C.

(57) ABSTRACT

A communication device configured to route communications between one or more out-of-coverage communication devices and a base station using one or more proximity services (ProSe). For example, the communication device can be configured as a mobile device-to network relay. The communication device can be configured to route communications between two or more out-of-coverage communication devices that are serviced by the communication device. The communication device can be configured to utilize Layer 3 and/or internet protocol (IP) routing. A base station can be configured to route communications between two or communication devices serviced by the base station. The base station can also be communication coupled to another base station via a backhaul communication connection, and be configured to route communications from one or more communication devices serviced by the base station to one or more other communication devices serviced by the other base station via the backhaul communication connection.

20 Claims, 13 Drawing Sheets

(56) References Cited

U.S. PATENT DOCUMENTS

| | | | |
|---|---|---|---|
| 2014/0301307 A1* | 10/2014 | Lee .................. | H04L 5/0055 370/329 |
| 2015/0043429 A1* | 2/2015 | Kim .................. | H04W 4/008 370/328 |
| 2015/0079899 A1* | 3/2015 | Hakola ............... | H04W 8/005 455/39 |
| 2016/0029423 A1* | 1/2016 | Ke .................... | H04W 76/023 370/329 |
| 2016/0128116 A1* | 5/2016 | Kim .................. | H04W 4/005 370/329 |
| 2016/0157056 A1* | 6/2016 | Kim .................. | H04W 4/023 455/414.1 |

* cited by examiner

COMMUNICATION SYSTEM HAVING RELAY ARCHITECTURE

CROSS-REFERENCE TO RELATED APPLICATIONS

This patent application claims the benefit of U.S. Provisional Patent Application No. 61/842,898, filed Jul. 3, 2013, entitled "Communication System Having Relay Architecture For IP Routing, Layer 3 Routing, And eNodeB Routing," and U.S. Provisional Patent Application No. 61/951,358, filed Mar. 11, 2014, entitled "Communication System Having Relay Architecture," each of which is incorporated herein by reference in its entirety.

BACKGROUND

Field

This application relates generally to wireless communications, including relaying communications to one or more communication devices outside a communication environment.

BRIEF DESCRIPTION OF THE DRAWINGS/FIGURES

The accompanying drawings, which are incorporated herein and form a part of the specification, illustrate the embodiments of the present disclosure and, together with the description, further serve to explain the principles of the embodiments and to enable a person skilled in the pertinent art to make and use the embodiments.

The embodiments of the present disclosure will be described with reference to the accompanying drawings. The drawing in which an element first appears is typically indicated by the leftmost digit(s) in the corresponding reference number.

DETAILED DESCRIPTION

Figure 1:
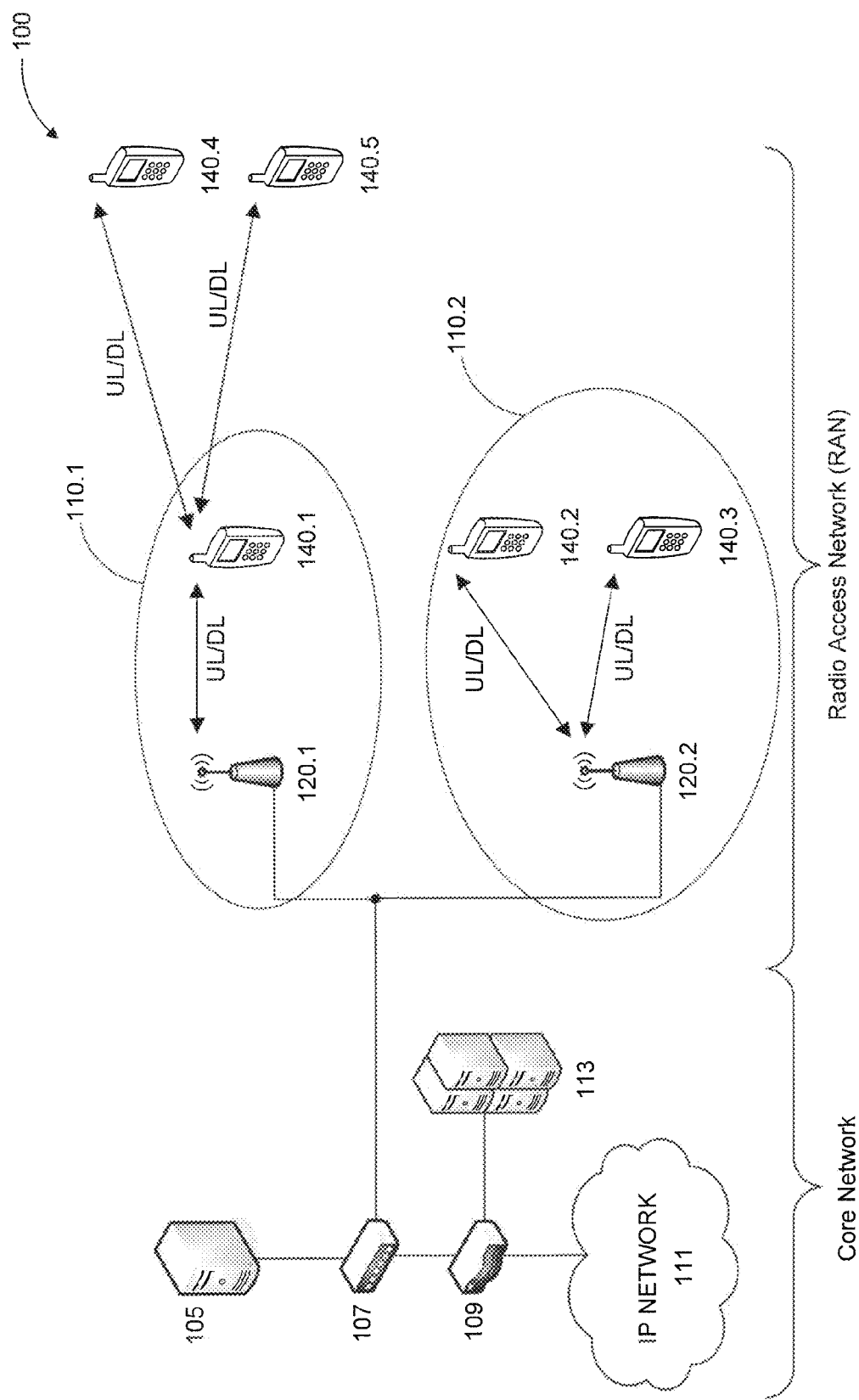
FIG. 1 illustrates an example network environment.

In the following description, numerous specific details are set forth in order to provide a thorough understanding of the embodiments of the present disclosure. However, it will be apparent to those skilled in the art that the embodiments, including structures, systems, and methods, may be practiced without these specific details. The description and representation herein are the common means used by those experienced or skilled in the art to most effectively convey the substance of their work to others skilled in the art. In other instances, well-known methods, procedures, components, and circuitry have not been described in detail to avoid unnecessarily obscuring aspects of the disclosure.

In the following disclosure, terms defined by the Long-Term Evolution (LTE) standard are sometimes used. For example, the term "eNodeB" or "eNB" is used to refer to what is commonly described as a base station (BS) or a base transceiver station (BTS) in other standards. The term "User Equipment (UE)" is used to refer to what is commonly described as a mobile station (MS) or mobile terminal in other standards. The LTE standard is developed by the 3rd Generation Partnership Project (3GPP) and described in the 3GPP specifications and International Mobile Telecomunnications-2000 (IMT-2000) standard, all of which are incorporated by reference in their entirety. Further, 3GPP refers to a communication network as a UTRAN (Universal Mobile Telecommunication System (UMTS) Terrestrial Radio Access Network, a E-UTRAN (Evolved UTRAN), and/or a GERAN (Global System for Mobile Communications (GSM) Enhanced Data rates for GSM Evolution (EDGE) Radio Access Network) to provide some examples. The 3GPP LTE specifications include the European Telecommunications Standard Institute (ETSI) Technical Specification (TS) 136 Series, referred hereinafter as "3GPP TS 36 Series," each of which is incorporated herein by reference in its entirety.

Although exemplary embodiments are described with reference to LTE, the more generic terms "mobile device" and "base station" are used herein except where otherwise noted to refer to the LTE terms "User Equipment (UE)" and "eNodeB/eNB," respectively. Further, the embodiments are not limited to implementation in LTE, as other communication standards could be used, as will be understood by those skilled in the arts.

As will be apparent to one of ordinary skill in the relevant art(s) based on the teachings herein, exemplary embodiments are not limited to the LTE standard, and can be applied to other cellular communication standards, including (but not limited to) Evolved High-Speed Packet Access (HSPA+), Wideband Code Division Multiple Access (W-CDMA), CDMA2000, Time Division-Synchronous Code Division Multiple Access (TD-SCDMA), Global System for Mobile Communications (GSM), General Packet Radio Service (GPRS), Enhanced Data Rates for GSM Evolution (EDGE), and Worldwide Interoperability for Microwave Access (WiMAX) (IEEE 802.16) to provide some examples. Further, exemplary embodiments are not limited to cellular communication networks and can be used or implemented in other kinds of wireless communication access networks, including (but not limited to) Wireless Local Area Network(s) (WLAN) (IEEE 802.11), Bluetooth (IEEE 802.15.1 and Bluetooth Special Interest Group (SIG)), Near-field Communication (NFC) (ISO/IEC 18092), ZigBee (IEEE 802.15.4), Radio-frequency identification (RFID), and/or infrared communication, to provide some examples. These various standards and/or protocols are each incorporated by reference in their entirety.

For the purposes of this discussion, the term "processor circuitry" shall be understood to be one or more: circuit(s), processor(s), or a combination thereof. For example, a circuit can include an analog circuit, a digital circuit, state machine logic, other structural electronic hardware, or a combination thereof. A processor can include a microprocessor, a digital signal processor (DSP), or other hardware processor. The processor can be "hard-coded" with instructions to perform corresponding function(s) according to embodiments described herein. Alternatively, the processor can access an internal and/or external memory to retrieve instructions stored in the memory, which when executed by the processor, perform the corresponding function(s) associated with the processor.

FIG. 1 illustrates an example communication environment 100 that includes a radio access network (RAN) and a core network. The RAN includes base stations 120.1 and 120.2, and one or more mobile devices 140. The core network includes one or more well-known communication components—such as one or more mobility management entities (MMEs) 105, one or more network switches 107, one or more network gateways 109, and/or one or more servers 113—communicatively coupled to an internet protocol (IP) backhaul network 111. For example, the base stations 120 can be communicatively coupled to the MME(s) 105 via switch(es) 107. The switch(es) 107 can be configured to communicatively couple the MME(s) 105 and base stations 120 to the IP backhaul network 111 via gateway(s) 109. The server(s) 113 can be communicatively coupled to the core network via the gateway(s) 109. The number of base stations 120, mobile devices 140, MMEs 105, switches 107, gateways 109, servers 113 and/or IP networks 111 are not limited to the exemplary quantities illustrated in FIG. 1, and the communication environment 100 can include any number of the various components as would be understood by one of ordinary skill in the relevant art(s) without departing from the spirit and scope of the present disclosure.

In an exemplary embodiment, the base station(s) 120 and mobile device(s) 140 each include one or more processors, circuitry, and/or logic that are configured to communicate via one or more wireless technologies, and the mobile device(s) 140 are further configured to support co-existing wireless communications. One or more of the mobile devices 140 can include, for example, a transceiver having one or more processors, circuitry, and/or logic that are configured to transmit and/or receive wireless communications via one or more wireless technologies within the communication environment 100. One or more of the base stations 120 can include one or more processors, circuitry, and/or logic that are configured to: (1) receive one or more wired communications via one or more well-known wired technologies from one or more components of the core network and/or from one or more other base stations 120, and transmit one or more corresponding wireless communications via one or more wireless technologies within the communication environment 100, (2) receive one or more wireless communications within the communication environment 100 via one or more wireless technologies and transmit one or more corresponding wired communications via one or more well-known wired technologies to one or more components of the core network and/or to one or more other base stations 120, and (3) to transmit and/or receive wireless communications via one or more wireless technologies within the communication environment 100. The wireless technologies can include one or more of the wireless protocols discussed above. The one or more processors can include (and be configured to access) one or more internal and/or external memories that store instructions and/or code that, when executed by the processor(s), cause the processor(s) to perform one or more operations to facilitate communications via one or more wireless and/or wired technologies as discussed herein.

In an exemplary embodiment, the mobile device 140.1 can be configured to communicate with the base station 120.1 in a serving cell or sector 110.1 of the communication environment 100. For example, the mobile device 140.1 receives signals on one or more downlink (DL) channels from the base station 120.1, and transmits signals to the base station 120.1 on one or more respective uplink (UL) channels. Similarly, the mobile device 140.2 and/or the mobile device 140.3 can be configured to communicate with the base station 120.2 in a serving cell or sector 110.2 of the communication environment 100. For example, the mobile devices 140.2 and/or 140.3 receive signals on one or more downlink (DL) channels from the base station 120.2, and transmit signals to the base station 120.2 on one or more respective uplink (UL) channels.

In exemplary embodiments, one or more of the mobile devices 140 can be configured to communicate with one or more other mobile devices 140 utilizing one or more device-to-device communication connections (e.g., using one or more personal access networks (PANs)) via one or more wireless communication protocols—such as LTE, Bluetooth, WLAN, etc. The one or more mobile devices 140 can be within, or outside of, the serving cell or sector 110. For example, the mobile device 140.1 can be configured to communicate with mobile device 140.4 and/or mobile device 140.5 via one or more UL and/or DL channels within one or more device-to-device communication connections. For the purposes of this disclosure, the communication between a mobile device 140 to a base station 120 via another mobile device 140 utilizing a device-to-device communication connection can be referred to as a "mobile device-to-network relay" (e.g., UE-to-network relay). As another example, the mobile device 140.4 can be configured to communicate with the mobile device 140.5 via the mobile device 140.1 functioning as a relay. For the purposes of this disclosure, the communication between two mobile devices (e.g., mobile devices 140.4 and 140.5) via a third mobile device 140 (e.g., mobile device 140.1) can be referred to as a "mobile device-to-mobile device relay" (e.g., UE-to-UE relay, device-to-device relay, etc.). In this example, the mobile device 140.4 and/or mobile device 140.5 can also be configured to communicate with the base station 120.1 via the mobile device 140.1 functioning as a mobile device-to-network relay. As another example, mobile device 140.2 can be configured to communicate with mobile device 140.3 via the base station 120.2 within the serving cell or sector 110.2. For the purposes of this disclosure, the communication between a mobile device 140 and another mobile device 140 via a common base station 120 that serves both can be referred to as "intra-base station routing" (e.g., intra-eNodeB routing). As would be understood by those skilled in the relevant art(s), the mobile device 140.2 and/or the mobile device 140.3 can be in communication with one or more other mobile devices so as to function as a mobile device-to-network relay and/or a mobile device-to-mobile device relay for one or more other mobile devices 140, similar to that shown for mobile device 140.1.

In an exemplary embodiment, the mobile device(s) 140 can be configured to utilize proximity services (ProSe) to establish one or more device-to-device communication connections. ProSe refers to the processes and/or mechanisms implemented by a mobile device 140 to discover one or more other mobile devices 140 within the proximity of the mobile device 140, and to identify one or more services provided by the other mobile device(s) 140 that may be utilized by the mobile device 140. For example, mobile devices 140.4 and/or 140.5 can be configured to utilize ProSe to discover mobile device 140.1 in the vicinity, and to discover that the mobile device 140.1 can function as a ProSe relay mobile device configured to allow the mobile devices 140.4 and/or 140.5 to communicate to the base station 120.1 (via the mobile device 140.1).

In an exemplary embodiment, one of the mobile devices 140 within the serving cell or sector 110.1 can be configured to communicate with one or more mobile devices 140 within serving cell or sector 110.2 via a base station-to-base station connection. For example, base station 120.1 can be communicatively coupled to base station 120.2 via one or more backhaul connections—such as an Xn interface as discussed in more detail in the 3GPP TS 36 Series specifications. In an exemplary embodiment, the Xn interface utilize one or more wired and/or wireless communication networks, including (but not limited to), for example, an internet protocol (IP) network using the Ethernet standard as defined in Institute of Electrical and Electronics Engineers (IEEE) 802.3 (e.g., 10 Gigabit Ethernet, 100 Gigabit Ethernet, etc.), one or more fiber optical networks, one or more satellite communication networks, one or more microwave communication networks, and/or any other well-known wired and/or wireless communication protocols as would be understood by those of ordinary skill in the relevant art(s) without departing from the spirit and scope of the present disclosure. For the purposes of this disclosure, a communication system configured for routing communications via a base station-to-base station connection can be referred to as "inter-base station routing" (e.g., inter-eNodeB routing).

Examples of the mobile device(s) 140 include (but are not limited to) a mobile computing device—such as a laptop computer, a tablet computer, a mobile telephone or smartphone, a "phablet," a personal digital assistant (PDA), and mobile media player; and a wearable computing device—such as a computerized wrist watch or "smart" watch, and computerized eyeglasses. In some embodiments, the mobile device 140 may be a stationary device, including, for example, a stationary computing device—such as a personal computer (PC), a desktop computer, a computerized kiosk, and an automotive/aeronautical/maritime in-dash computer terminal.

In an exemplary embodiment, the base stations 120 include one or more processors, circuitry, and/or logic that are configured for communications conforming to 3GPP's Long-Term Evolution (LTE) specification (e.g., the base stations are LTE base stations), and the mobile device 140 includes one or more processors, circuitry, and/or logic that is configured for communications conforming to 3GPP's LTE specification. The one or more processors, circuitry, and/or logic of the mobile device 140 can be further configured for communications conforming to one or more other 3GPP and/or non-3GPP protocols via one or more device-to-device communication networks established with one or more other mobile devices. In this example, the communication network 100 is an LTE communication network. In an exemplary embodiment, the communication of the mobile device 140 with one or more other mobile devices 140 can be a device-to-device communication that bypasses the base stations 120.

Those skilled in the relevant art(s) will understand that the base station(s) 120 and the mobile device(s) 140 are not limited to the exemplary 3GPP and non-3GPP wireless protocols discussed herein, and the base station(s) 120 and/or the mobile device(s) 140 can be configured for wireless communications conforming to one or more other 3GPP and/or non-3GPP wireless protocols in addition to, or in the alternative to, the wireless protocols discussed herein.

The switch 107 includes one or more processors, circuitry, and/or logic that are configured to route data between the various components of the core network and/or the radio access network (RAN). For example, the switch 107 can be configured to route data between one or more of the MMEs 105 and one or more base stations 120.

The gateway 109 includes one or more processors, circuitry, and/or logic that are configured to route data between the various components of the core network and/or RAN. The gateway 109 can be configured as a mobility anchor for the user plane during inter-base station 120 handovers and as an anchor for mobility between LTE and other 3GPP technologies. For idle state mobile devices 140, the gateway 109 can be configured to terminate the downlink data path and trigger paging when downlink data arrives for the mobile device 140. In an exemplary embodiment, the gateway 109 is configured as a serving gateway (SGW), a packet data network (PDN) gateway (PGW), and/or an evolved packet data gateway (ePDG).

The IP network 111 includes one or more devices and/or components configured to exchange data with one or more other devices and/or components via one or more wired and/or wireless communications protocols. In exemplary embodiments, the base stations 120 communicate with one or more service providers via the IP network 111.

The server 113 includes one or more processors, circuitry, and/or logic that are configured to process user-related information, subscription-related information, and/or proximity services (ProSe) information. The server 113 can include a memory that stores data and/or instructions, where when the instructions are executed by the processor(s), perform the functions described herein. In an exemplary embodiment, the server 113 can be configured as group communication system enablers (GCSE) application server, an Access Network Discovery and Selection Function (ANDSF) server, a home subscriber server (HSS) and/or a ProSe server. For example, the server 113 can be configured to perform mobility management, call and session establishment support, authentication and/or access authorization, connectivity and/or prioritization support for 3GPP and/or non-3GPP access networks, and/or determine the proximity of device(s) and/or the service(s) of such device(s).

The mobility management entities (MMEs) 105 each provide LTE network access control and management, and include one or more processors, circuitry, and/or logic that is configured to process UE location information and/or UE movement and speed information, perform idle mode paging and tagging procedures, and/or perform authentication procedures of one or more mobile devices 140 by interacting with one or more home subscriber servers (HSS). For authentication purposes, the MME 105 can be configured to verify the authorization of a mobile device 140 to camp on a service provider's Public Land Mobile Network (PLMN) and enforces roaming restrictions of the mobile devices 140. The MMEs 105 can also be configured to perform one or more bearer activation/deactivation procedures and/or to select a serving gateway (SGW) (e.g., gateway 109) for a mobile device's 140 initial attachment to the communication environment 100 and at times of intra-LTE handover operations involving core network node relocations. In operation, the mobile devices 140 register with one of the MMEs 105 within the pool of MMEs 105. During maintenance of an MME, overloading of the MME, and/or any other operation as would be understood by those skilled in the relevant arts, an MME can be configured to shut down and/or restrict connections from registered mobile devices 140. In these examples, registered mobile device(s) 140 seeking an active connection to the communication environment 100 can perform a load balancing procedure that registers the mobile device(s) 140 with another MME of the pool of MMEs 105. Here, the base station 120 communicating with the mobile device(s) 140 can select the other MME for registration.

Figure 2:
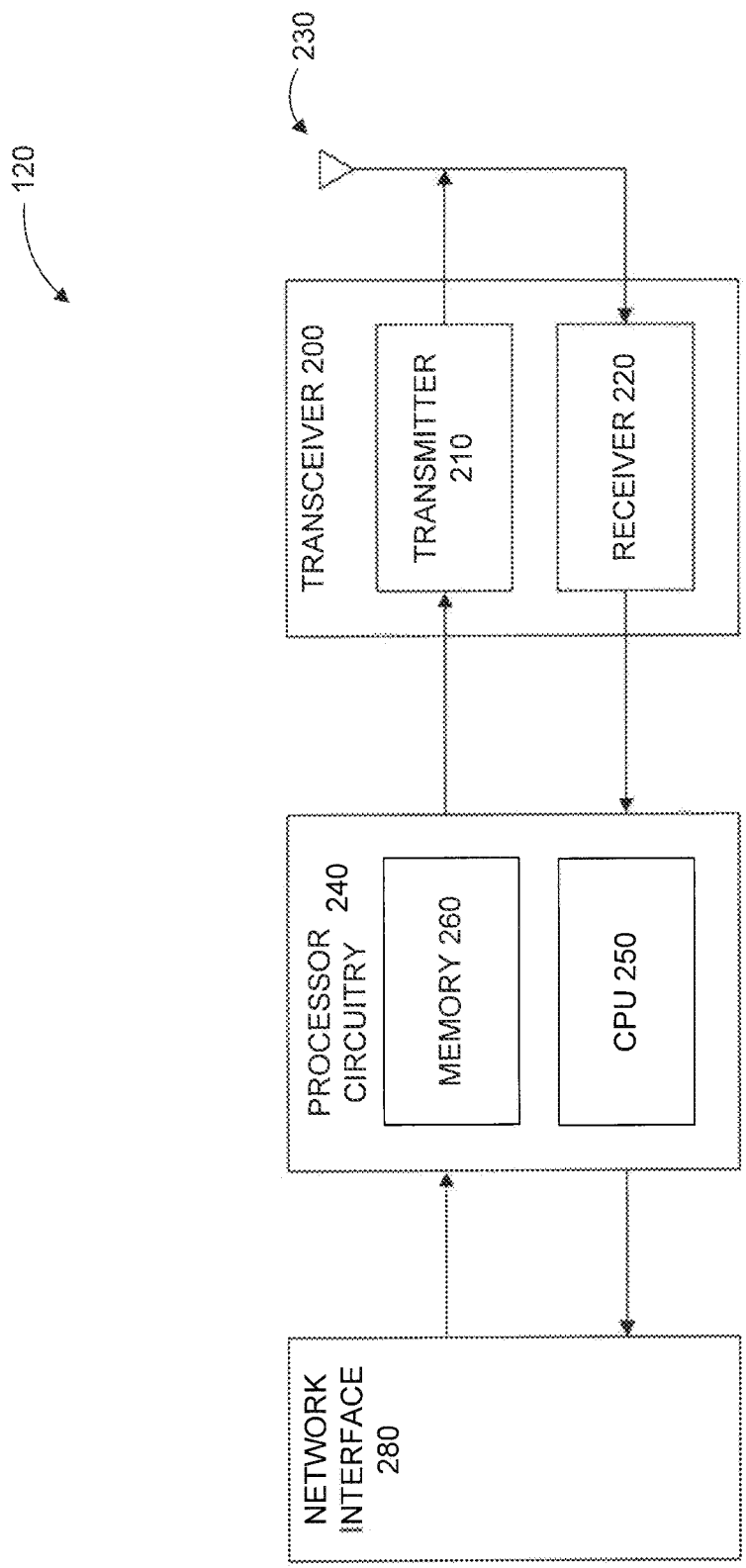
FIG. 2 illustrates a base station according to an exemplary embodiment of the present disclosure.

FIG. 2 illustrates the base station 120 according to an exemplary embodiment of the present disclosure. For example, the base station 120 can include a transceiver 200 and a network interface 280, each communicatively coupled to processor circuitry 240.

The transceiver 200 includes one or more processors, circuitry, and/or logic that are configured to transmit and/or receive wireless communications via one or more wireless technologies within the communication environment 100. In particular, the transceiver 200 can include a transmitter 210 and a receiver 220 that have one or more processors, circuitry, and/or logic configured to transmit and receive wireless communications, respectively, via one or more antennas 230. Those skilled in the relevant art(s) will recognize that the transceiver 200 can also include (but is not limited to) a digital signal processor (DSP), modulator and/or demodulator, a digital-to-analog converter (DAC) and/or an analog-to-digital converter (ADC), and/or a frequency converter (including mixers, local oscillators, and filters) to provide some examples. Further, those skilled in the relevant art(s) will recognize that the antenna 230 may include an integer array of antennas, and that the antenna 230 may be capable of both transmitting and receiving wireless communication signals. For example, the base station 120 can be configured for wireless communication utilizing a Multiple-input Multiple-output (MIMO) configuration.

In an exemplary embodiment, the transceiver 200 is configured for wireless communications conforming to one or more wireless protocols defined by 3GPP. For example, the transceiver 200 is configured for wireless communications conforming to 3GPP's LTE specification. In this example, the transceiver 200 can be referred to as LTE transceiver 200. Those skilled in the relevant art(s) will understand that the transceiver 200 is not limited to communication conforming to 3GPP's LTE specification, and can be configured for communications that conform to one or more other 3GPP protocols and/or one or more non-3GPP protocols. It should be appreciated that the transceiver 200 can be referred to by one or more other 3GPP and/or non-3GPP protocols in embodiments where the transceiver 200 is configured for such other communications conforming to the other 3GPP and/or non-3GPP protocols.

The network interface 280 includes one or more processors, circuitry, and/or logic that are configured to transmit and/or receive communications via one or more wired technologies to/from one or more components of the core network (e.g., switch 115). Those skilled in the relevant art(s) will recognize that the network interface 280 can also include (but is not limited to) a digital signal processer (DSP), modulator and/or demodulator, a digital-to-analog converter (DAC) and/or an analog-to-digital converter (ADC), and/or a frequency converter (including mixers, local oscillators, and filters) to provide some examples. Further, those skilled in the relevant art(s) will understand that the network interface 280 is not limited to wired communication technologies and can be configured for communications that conform to one or more well-known wireless technologies in addition to, or alternatively to, one or more well-known wired technologies.

The processor circuitry 240 can include one or more processors (CPUs) 250 and/or circuits configured to carry out instructions to perform arithmetical, logical, and/or input/output (I/O) operations of the base station 120 and/or one or more components of the base station 120. The processor circuitry 240 can further include a memory 260 that stores data and/or instructions, where when the instructions are executed by the processor(s) 250, perform the functions described herein. The memory 260 can be any well-known volatile and/or non-volatile memory, including, for example, read-only memory (ROM), random access memory (RAM), flash memory, a magnetic storage media, an optical disc, erasable programmable read only memory (EPROM), and programmable read only memory (PROM). The memory 260 can be non-removable, removable, or a combination of both.

Figure 3:
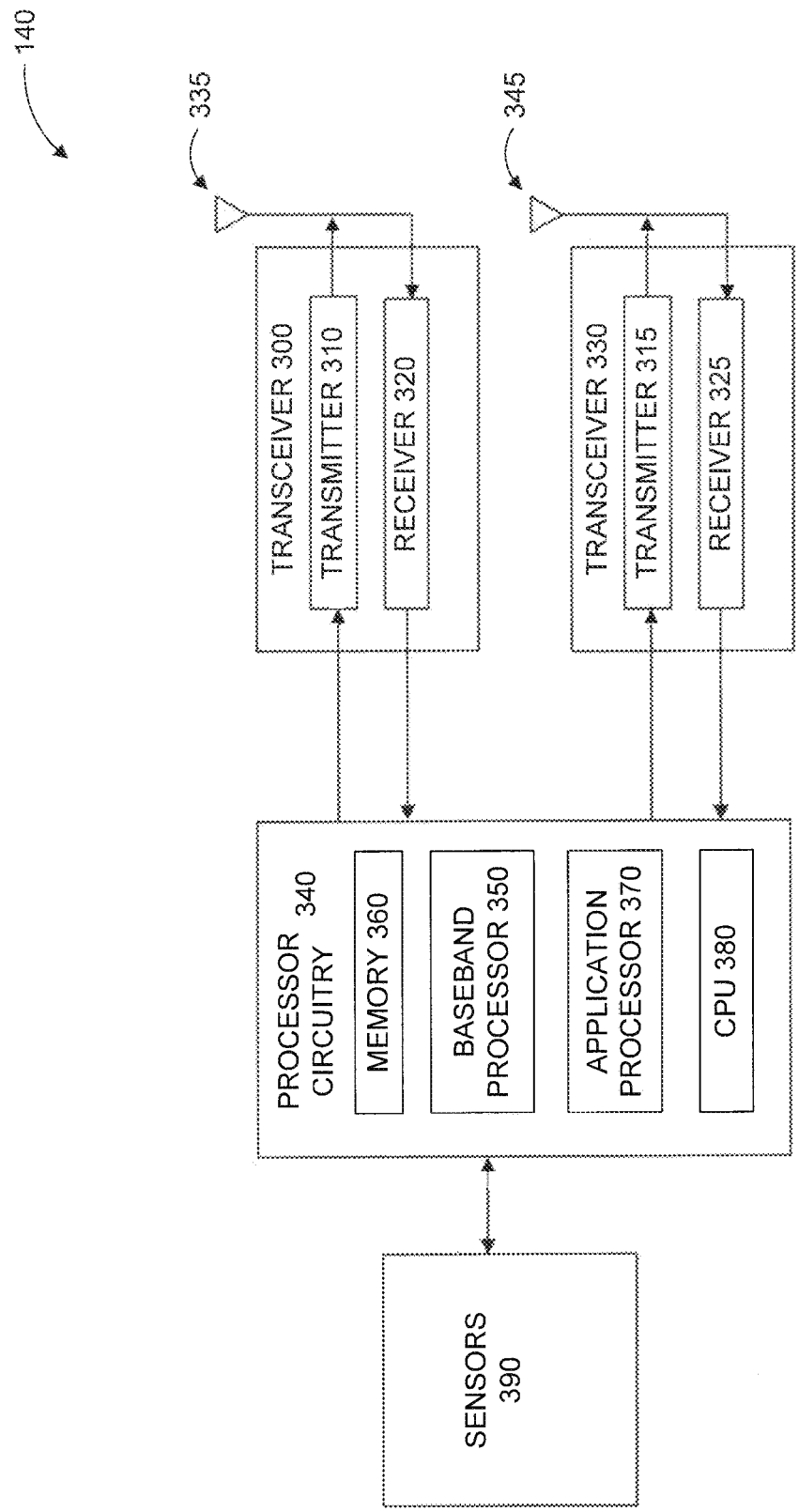
FIG. 3 illustrates a mobile device according to an exemplary embodiment of the present disclosure.

FIG. 3 illustrates the mobile device 140 according to an exemplary embodiment of the present disclosure. The mobile device 140 can include processor circuitry 340 communicatively coupled to one or more transceivers configured to communicate with one or more 3GPP and/or non-3GPP communication protocols. That is, the mobile device 140 can be configured for wireless communications conforming to one or more wireless protocols defined by 3GPP and/or one or more non-3GPP wireless protocols. In an exemplary embodiment, the mobile device 140 includes an LTE transceiver 300 and a WLAN transceiver 330. In this example, the mobile device 140 is configured for wireless communication according to 3GPP's LTE specification and for wireless communication according to IEEE's 802.11 WLAN specification. Those skilled in the relevant art(s) will understand that the mobile device 140 is not limited to these exemplary 3GPP and non-3GPP wireless protocols, and the mobile device 140 can be configured for wireless communications conforming to one or more other 3GPP and/or non-3GPP wireless protocols in addition to, or in the alternative to, the wireless protocols discussed herein, and/or to a subset of the LTE and WLAN specifications discussed above.

The LTE transceiver 300 includes one or more processors, circuitry, and/or logic that are configured for transmitting and/or receiving wireless communications conforming to 3GPP's LTE specification. In particular, the LTE transceiver 300 can include an LTE transmitter 310 and an LTE receiver 320 that have one or more processors, circuitry, and/or logic configured for transmitting and receiving wireless communications conforming to 3GPP's LTE specification, respectively, via one or more antennas 335. Transceiver 300 need not be limited to LTE, and could operate according to one or more other 3GPP and/or non-3GPP protocols, as will be understood by those skilled in art.

The WLAN transceiver 330 includes one or more processors, circuitry, and/or logic that are configured for transmitting and/or receiving wireless communications conforming to IEEE's 802.11 WLAN specification. In particular, the WLAN transceiver 330 can include a WLAN transmitter 315 and a WLAN receiver 325 that have one or more processors, circuitry, and/or logic configured for transmitting and receiving wireless communications conforming to IEEE's 802.11 WLAN specification, respectively, via one or more antennas 345. Transceiver 330 need not be limited to WLAN, and could operate according to one or more other 3GPP and/or non-3GPP protocols, as will be understood by those skilled in art.

In exemplary embodiments, the LTE transceiver 300 and the WLAN transceiver 330 can include (but are not limited to) a digital signal processer (DSP), modulator and/or demodulator, a digital-to-analog converter (DAC) and/or an analog-to-digital converter (ADC), and/or a frequency converter (including mixers, local oscillators, and filters) that can be utilized in transmitting and/or receiving of wireless communications. Further, those skilled in the relevant art(s) will recognize that antennas 335 and/or 345 may include an integer array of antennas, and that the antennas may be capable of both transmitting and receiving wireless communication signals. It will also be understood by those skilled in the relevant art(s) that any combination of the LTE transceiver 300 and WLAN transceiver 330, as well as one or more other transceivers, circuits, and/or processors may be embodied in a single chip and/or die.

The processor circuitry 340 includes one or more processors, circuitry, and/or logic that are configured to control the overall operation of the mobile device 140, including the operation of the LTE transceiver 300 and WLAN transceiver 330. The one or more processors can include one or more baseband processors 350, one or more application processors 370, and/or one or more other processors (CPUs) 380. As would be understood by those skilled in the relevant arts, any combination of the baseband processor(s) 350, application processor(s) 370 and/or processor(s) 380 may be embodied as a single chip and/or die.

The processor circuitry 340 can further include a memory 360 that stores data and/or instructions, where when the instructions are executed by the baseband processor(s) 350, and/or application processor(s) 370, and/or CPUs 380 to perform the functions described herein. Similarly, the memory 360 can be any well-known volatile and/or non-volatile memory, and can be non-removable, removable, or a combination of both.

The baseband processor(s) 350 can be configured to control the operation of the LTE transceiver 300 and/or WLAN transceiver 330, including transmitting and/or receiving of wireless communications via the LTE transceiver 300 and/or WLAN transceiver 330, and/or perform one or more baseband processing functions, including (but not limited to), for example, media access control (MAC), encoding/decoding, modulation/demodulation, data symbol mapping, error correction, and the like.

The application processor(s) 370 can be configured to carry out instructions to perform arithmetical, logical, and/or input/output (I/O) operations of the mobile device 140 and/or of one or more components of the mobile device 140. For example, the application processor(s) 370 can be configured to carry out internally-stored instructions and/or instructions stored in memory 360, including the running of one or more applications and/or operating systems, including user applications.

The processor(s) (CPU) 380 can be configured to control the operation of the mobile device 140, such as power management (e.g. battery control and monitoring), display settings, volume control, and/or user interactions via one or more user interfaces.

In an exemplary embodiment, the mobile device 140 includes one or more other transceivers (not shown) configured to communicate via one or more 3GPP protocols, one or more non-3GPP protocols, and/or one or more other well-known communication technologies. In an exemplary embodiment, the one or more other transceivers can be configured for navigational purposes utilizing one or more well-known navigational systems, including the Global Navigation Satellite System (GNSS), the Russian Global Navigation Satellite System (GLONASS), the European Union Galileo positioning system (GALILEO), the Japanese Quasi-Zenith Satellite System (QZSS), the Chinese BeiDou navigation system, and/or the Indian Regional Navigational Satellite System (IRNSS) to provide some examples. Further, the mobile device 140 can include one or more positional and/or movement sensors 390 (e.g., GPS, accelerometer, gyroscope sensor, etc.) implemented in (and/or in communication with) the mobile device 140. Here, the location and/or movement of the mobile device 140 can be determined using one or more transceivers configured for navigation purposes, one or more of the positional and/or movement sensors 390, and/or one or more positional determinations using signal characteristics relative to one or more base stations and/or access points.

As set forth in one or more of the 3GPP TS 36 Series specifications, LTE downlink and uplink transmissions are organized into radio frames each having a duration of 10 milliseconds (ms). Here, a radio frame consists of 10 subframes, each subframe consisting of two consecutive 0.5 ms slots. Each slot comprises six OFDM symbols for an extended cyclic prefix and seven OFDM symbols for a normal cyclic prefix. In both the uplink and downlink, data is time and frequency multiplexed by mapping OFDM symbols to a time/frequency resource grid consisting of elementary units called resource elements (REs) that are uniquely identified by the antenna port, sub-carrier position, and OFDM symbol index within a radio frame. A group of resource elements corresponding to twelve consecutive sub-carriers within a single time slot (e.g. 0.5 ms) is referred to as a resource block (RB). Further, as set forth in one or more of the 3GPP TS 36 Series specifications, an evolved packet system (EPS) bearer is a set of network parameters that define one or more data-specific treatments and/or services, for example, related to traffic flow and/or packets. The EPS bearer can be, for example, a default bearer that offers best effort service, or a dedicated bearer that defines a tunnel for one or more types of traffic. In operation, the EPS bearer is associated with one or more resource elements (REs) of the time/frequency resource grid.

In exemplary embodiments, the communication environment 100 can be configured for communications utilizing, a mobile device-to-mobile device relay, a mobile device-to-network relay, inter-base station routing, and/or intra-base station routing.

As explained above, a mobile device-to-mobile device relay is a mobile device 140 (e.g., mobile device 140.1) within a serving cell or sector 110 that facilitates communication between two or more other mobile devices 140 (e.g., mobile device 140.4 and 140.5) outside of the serving cell or sector 110. Here, mobile devices 140 outside of the serving cell or sector 110 can be referred to as out-of-coverage mobile devices. In an exemplary embodiment, the mobile device 140 functioning as a mobile device-to-mobile device relay can utilize IP routing and forwarding.

A mobile device-to-network relay is a mobile device 140 (e.g., mobile device 140.1) within a serving cell or sector 110 that facilitates communication between a base station (e.g., base station 120.1) and another mobile device 140 (e.g., mobile device 140.4 or 140.5) that is outside of the serving cell or sector 110. In an exemplary embodiment, the mobile device 140.1 functions as a mobile device-to-network relay that utilizes Layer 3 routing based on an evolved packet system (EPS) bearer designated for the out-of-coverage mobile device 140, which is in communication with the mobile device 140.1. In this example, the designated EPS bearer for the out-of-coverage mobile device 140 is in addition to an EPS bearer utilized by the relay mobile device 140 (e.g., mobile device 140.1) for its own communication with the base station 120. For the purposes of this disclosure, EPS bearers can also be referred to as "radio bearers," and/or "bearers", for short. Further, bearers associated with a relay mobile device and/or relay base station can be referred to as "relay bearers" and/or "Proximity services (ProSe) relay bearers."

In another exemplary embodiment, the mobile device 140 functions as a mobile device-to-network relay that can utilize IP routing and/or forwarding with a designated relay bearer. For example, the mobile device 140.1 functioning as the mobile device-to-network relay can utilize IP routing and forwarding to function as a relay for two or more out-of-coverage mobile devices (e.g., mobile devices 140.4 and 140.5). In this example, the device-to-network relay utilizes a designated EPS bearer (e.g., ProSe Relay bearer) for communications with the two or more out-of-coverage mobile devices 140.4 and 140.5 in addition to an EPS bearer for its own communications between the relay mobile device 140.1 and the serving base station 120. In operation, the relay mobile device 140.1 is configured to utilize IP routing and forwarding for communications using the ProSe Relay bearer to route communications to the appropriate out-of-coverage mobile device 140.4 and/or 140.5 being served by the relay mobile device 140.1.

Inter-base station routing is a base station-to-base station configuration that facilitates communications between a first mobile device 140 (e.g., mobile device 140.1) served by a first base station 120 (e.g., base station 120.1) and a second mobile device 140 (e.g., mobile device 140.2) served by a second base station 120 (e.g., base station 120.2) that is communicatively coupled to the first base station 120.1. For example, base station 120.1 can be communicatively coupled to base station 120.2 via one or more backhaul connections—such as an Xn interface as discussed in more detail in the 3GPP TS 36 Series specifications. In operation, communications between the mobile device 140 and its serving base station 120 can utilize an EPS bearer, and the base station 120 can be configured map the bearer to the Xn interface to facilitate communication of information and/or data to the other base station 120 via the Xn interface. The mapping of radio bearers to/from the Xn interface can include any well-known packet processing—such as, packet analysis, header and/or payload processing, and/or packetization/de-packetization procedures. For example, the base station 120.1 can be configured to receive communications from the mobile device 140.1 using a first radio bearer and to convert the communications to a packetized format for transmission to the other base station 120.2 via the Xn interface. The base station 120.2 can be configured to perform a reversed procedure to process the received packetized communications for communication to the mobile device 140.2 using a second radio bearer associated with the mobile device 140.2.

Intra-base station routing is a base station 120 (e.g., base station 120.2) that facilitates communications between two or more mobile devices 140 (e.g., mobile device 140.2 and 140.3) that are served by a common base station 120. In an exemplary embodiment, the base station 120.2 can be configured to utilize a designated EPS bearer for each of the mobile devices 140.2 and 140.3 served by the base station 120.2. For example, the base station 120.2 can be configured to route communications received from the mobile device 140.2 using a first EPS bearer to the mobile device 140.3 using a second EPS bearer, and vice versa. In operation, the base station 120.2 can be configured to route the communications between the mobile devices 140.2 and 140.3 without communicating information and/or data to (and receiving from) one or more of the components of the core network.

Figure 4A:
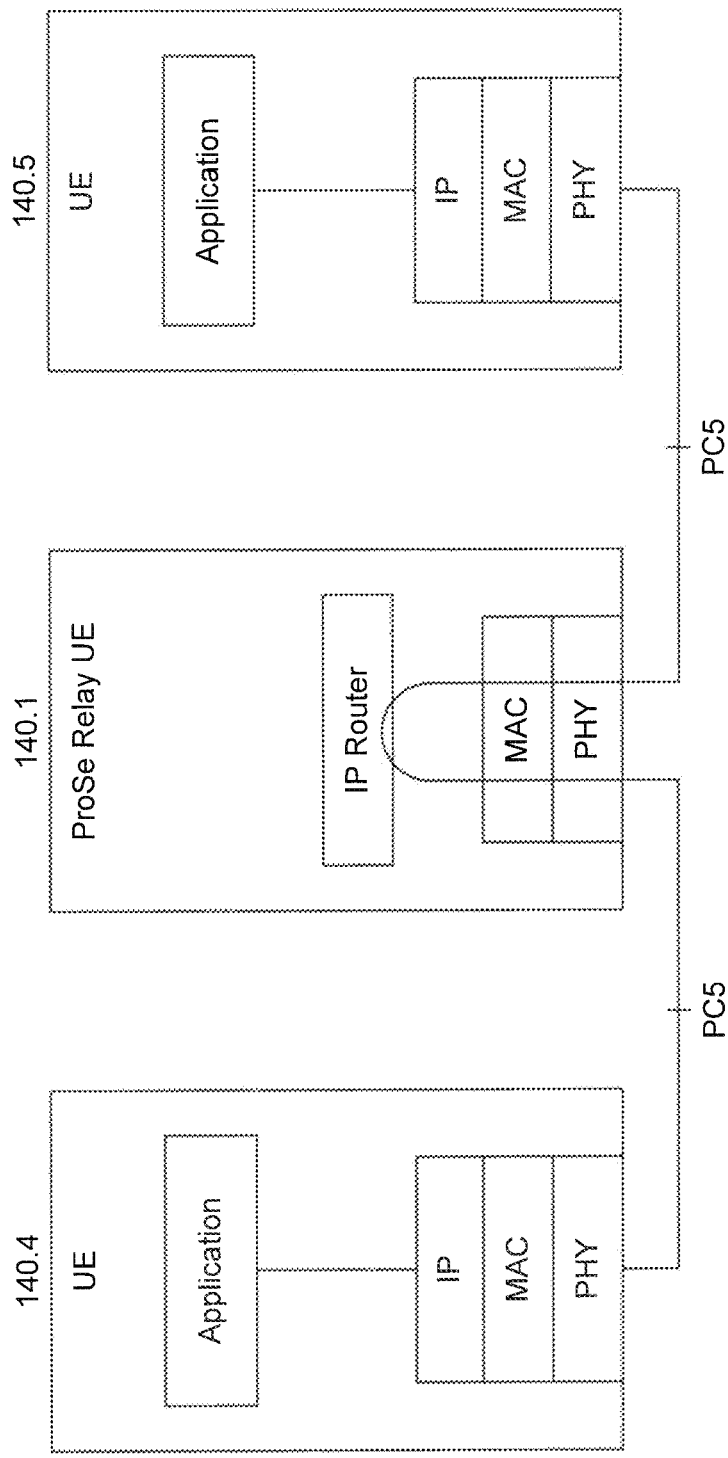
FIG. 4A illustrates a mobile device-to-mobile device relay architecture according to an exemplary embodiment of the present disclosure.

FIG. 4A illustrates a mobile device-to-mobile device relay architecture 400 according to an exemplary embodiment of the present disclosure. In an exemplary embodiment, the mobile device 140.1 is within serving cell or sector 110.1 and served by the base station 120.1. The mobile device 140.1 is configured as a mobile device-to-mobile device relay to route communications between mobile devices 140.4 and 140.5 that are outside of the serving cell or sector 110.1 (i.e., not served by the base station 120.1). For example, the mobile device 140.1 receives communications from the mobile device 140.4 that are destined for mobile device 140.5. In this example, the mobile device 140.1 is configured to determine that the communications are intended for mobile device 140.5 and to route the communications to mobile device 140.5 based on the determination. The mobile device 140.1 is configured to perform a similar procedure for communications received from the mobile device 140.5 that are intended for mobile device 140.4. In an exemplary embodiment, the mobile device 140.1 can be configured to route communications between the mobile devices 140.4 and 140.5 utilizing IP routing and forwarding, by examining the IP packet headers. An exemplary operation of the mobile device-to-mobile device relay architecture 400 is discussed in more detail with reference to FIG. 4B.

Figure 4B:
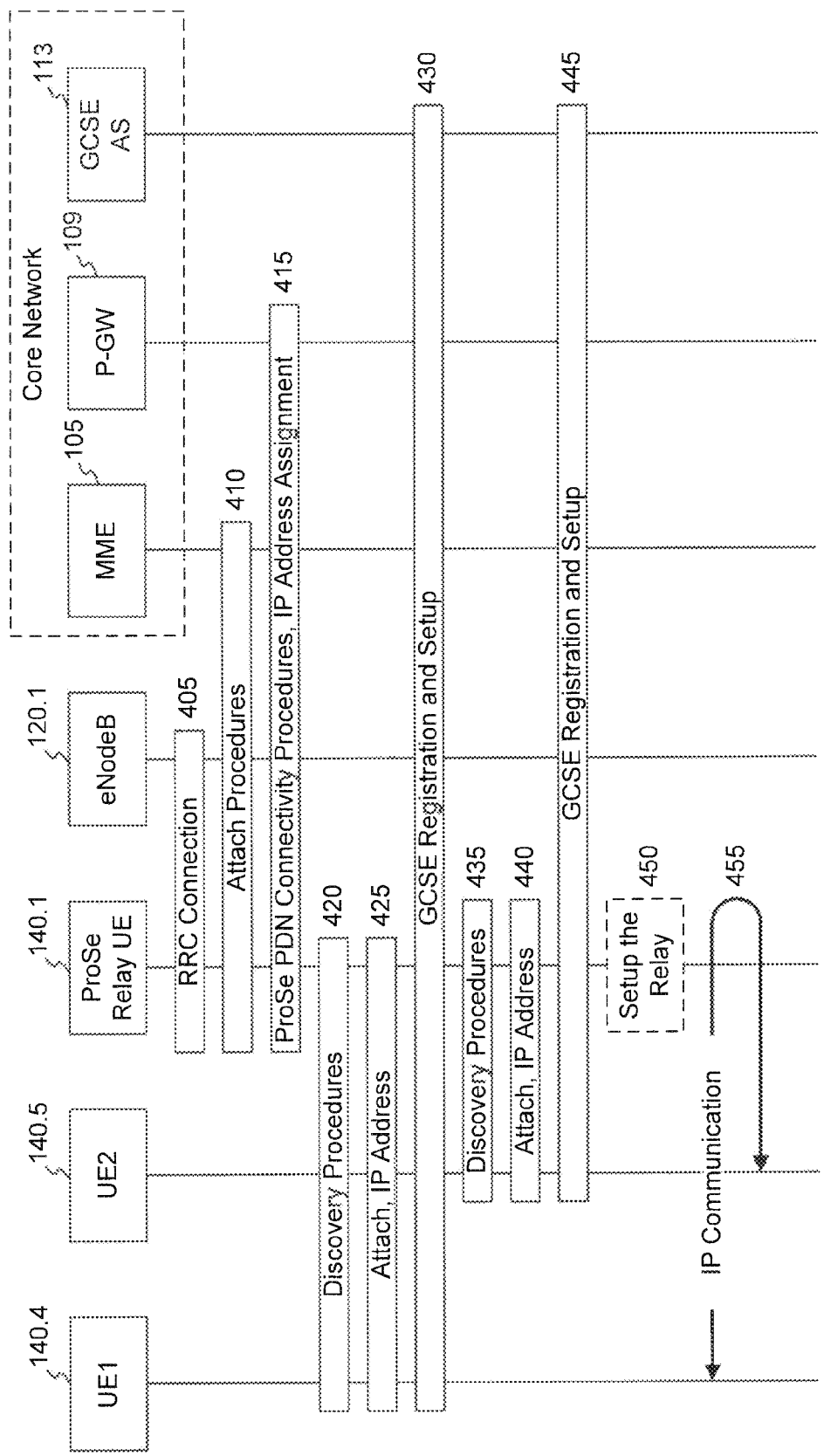
FIG. 4B illustrates a flowchart of a mobile device-to-mobile device relay method according to an exemplary embodiment of the present disclosure.

FIG. 4B illustrates a flowchart 402 of a mobile device-to-mobile device relay method according to an exemplary embodiment of the present disclosure. The method of flowchart 402 is described with continued reference to one or more of FIGS. 1-4A. The steps of the method of flowchart 402 are not limited to the order described below, and the various steps may be performed in a different order. Further, two or more steps of the method of flowchart 402 may be performed simultaneously with each other.

The method of flowchart 402 begins at step 405, where the mobile device 140.1 initiates a radio resource control (RRC) connection to the base station 120.1 by generating an RRC connection request and transmitting the RRC connection request to the base station 120.1. The RRC connection request can include an SAE temporary mobile subscriber identity (STMSI) and an establishment cause. The STMSI includes information used by the base station 120.1 to identify that the mobile device 140.1 is registered with MME 105. In response to the RRC connection request, the base station 120.1 generates and provides an RRC connection setup message to the mobile device 140.1. The RRC connection setup message informs the mobile device 140.1 that it now has an active connection and the mobile device 140.1 is operating in a connected mode.

After step 405, the method of flowchart 402 transitions to step 410, where the mobile device 140.1 is configured to attach to the base station 120.1 and MME 105. The attachment of the mobile device 140.1 to the base station 120.1 and the MME 105 associates the mobile device 140.1 with the base station 120.1 and the MME 105. In an exemplary embodiment, the mobile device 140.1 is configured to generate and transmit an RRC connection setup complete message to the base station 120.1 to acknowledge the RRC connection setup message. The RRC connection setup complete message can include a service request clause, which is forwarded to the MME 105 by the base station 120.1. The receipt of the service request clause by the MME 105 completes the association of the mobile device 140.1 with the MME 105. The attachment of the mobile device 140.1 to the base station 120.1 creates a packet data network (PDN) to facilitate communication between the mobile device 140.1 and the base station 120.1.

After step 410, the method of flowchart 400 transitions to step 415, where the mobile device 140.1 is configured to perform a proximity services (ProSe) packet data network (PDN) connection procedure to enable the mobile device 140.1 to operate as a mobile device-to-mobile device relay for one or more other mobile devices 140, e.g. mobile devices 140.4 and 140.5. The PDN connection procedure creates a ProSe packet data network (PDN) to facilitate communication between the out-of-coverage mobile device(s) and the base station 120.1 (via the mobile device 140.1). In an exemplary embodiment, the mobile device 140.1 generates a ProSe PDN connection request and provides the request to the base station 120.1, which forwards the request to the gateway 109. In response to the request, the gateway 109 generates and provides a ProSe PDN connection acknowledgement message to the mobile device 140.1 via the base station 120.1. The ProSe PDN connection acknowledgement message can include identification information—such as one or more internet protocol (IP) addresses—available to the mobile device 140.1 for assignment to prospective mobile device(s) 140 seeking ProSe connection(s) to the mobile device 140.1, where the mobile device 140.1 is acting as a relay.

After step 415, the method of flowchart 402 transitions to step 420, where the mobile device 140.4 performs a ProSe discovery procedure to determine available mobile devices, namely mobile device 140.1, that are configured to offer proximity services, such as the ability to function as a mobile device-to-mobile device relay. In an exemplary embodiment, the mobile device 140.4 can be configured to perform any well-known scanning procedure to identify prospective devices that may offer proximity services. In response to identifying a prospective device, the mobile device 140.4 can be configured to generate and provide a ProSe request to the identified device, namely the mobile device 140.1.

After step 420, the method of flowchart 402 transitions to step 425, where the mobile device 140.1 is configured to acknowledge the ProSe request from the mobile device 140.4 and to establish a device-to-device communication network (utilizing, for example, LTE, WLAN, Bluetooth, etc.) to connect to the mobile device 140.4. In an exemplary embodiment, the mobile device 140.1 can be configured to select and assign a corresponding IP address to the mobile devices 140.4 from the available IP addresses received from the gateway 109. The mobile device 140.1 can then be configured to generate and provide a ProSe request acknowledgment message to the mobile device 140.4. The ProSe request acknowledgment message can include the IP address assigned to the mobile device 140.4 to facilitate the exchange of communications via the device-to-device communication network.

After step 425, the method of flowchart 402 transitions to step 430, where the mobile device 140.4 is configured to register with the core network to facilitate communication with the core network via the mobile device 140.1. In an exemplary embodiment, the registration can include group communication system enablers (GCSE) registration. In operation, the mobile device 140.1 can be configured as a mobile device-to-network relay (in addition to a mobile device-to-mobile device relay) to facilitate communications between the mobile device 140.4 and the core network, in addition to communications with one or more mobile devices 140 (e.g., mobile device 140.5) served by mobile device 140.1. In an exemplary embodiment, the mobile device 140.4 registers with server 113 to provide the server 113 with ProSe information, including, for example, the IP address that has been assigned to the mobile device 140.4. In operation, the server 113 can be configured to store and manage ProSe information for one or more mobile devices 140 that have established communications with the core network via one or more of the proximity services (e.g., mobile device-to-network relay).

After step 430, the method of flowchart 402 transitions to step 435, where the mobile device 140.5 performs a ProSe discovery procedure similar to the ProSe discovery procedure performed by mobile device 140.4 in step 420. For example, the mobile device 140.5 can be configured to determine any available mobile devices, namely mobile device 140.1, that are configured to offer proximity services. In an exemplary embodiment, the mobile device 140.5 can be configured to perform any well-known scanning procedure to identify prospective devices that may offer proximity services. In response to identifying a prospective device, the mobile device 140.5 can be configured to generate and provide a ProSe request to the identified device, namely the mobile device 140.1.

After step 435, the method of flowchart 402 transitions to step 440, where the mobile device 140.1 is configured to acknowledge the ProSe request from the mobile device 140.5 similar to the acknowledgement of the ProSe request in step 425 for mobile device 140.4. For example, the mobile device 140.1 can be configured to establish a device-to-device communication network (utilizing, for example, LTE, WLAN, Bluetooth, etc.) to connect to the mobile device 140.5. In an exemplary embodiment, the mobile device 140.1 can be configured to select and assign a corresponding IP address to the mobile devices 140.5 from the available IP addresses received from the gateway 109. The mobile device 140.1 can then be configured to generate and provide a ProSe request acknowledgment message to the mobile device 140.5. The ProSe request acknowledgment message can include the IP address assigned to the mobile device 140.5 to facilitate the exchange of communications via the device-to-device communication network.

After step 440, the method of flowchart 402 transitions to step 445, where the mobile device 140.5 is configured to register with the core network to facilitate communication with the core network via the mobile device 140.1 similar to the registration by mobile device 140.4 in step 430. In an exemplary embodiment, the registration can include group communication system enablers (GCSE) registration. In operation, the mobile device 140.1 can be configured as a mobile device-to-network relay (in addition to a mobile device-to-mobile device relay) to facilitate communications between the mobile device 140.5 and the core network, in addition to communications with the mobile device 140.5 via the mobile device-mobile device relay. In an exemplary embodiment, the mobile device 140.5 registers with server 113 to provide the server 113 with ProSe information, including, for example, the IP address that has been assigned to the mobile device 140.5. In operation, the server 113 can be configured to store and manage ProSe information for one or more mobile devices 140 that have established communications with the core network via one or more of the proximity services (e.g., mobile device-to-network relay).

After step 445, the method of flowchart 402 transitions to step 450, where the mobile device 140.1 establishes the mobile device-mobile device relay between the mobile devices 140.4 and 140.5. In operation, the mobile device-mobile device relay utilizes the IP addresses assigned to the mobile devices 140.4 and 140.5 to route communications between the mobile devices 140.4 and 140.5. In an exemplary embodiment, the mobile device 140.1 can be configured to generate IP routing tables that include the IP addresses assigned to the mobile devices that are connected to the mobile device 140.1 via one or more device-to-device communication networks, namely mobile devices 140.4 and 140.5. The IP routing tables can include (but are not limited to), for example, identification information of the corresponding mobile devices (e.g., mobile devices 140.4 and 140.5)—such as corresponding IP addresses, phone numbers, email addresses, International Mobile Station Equipment Identities (IMEI), International mobile subscriber identities (IMSI), media access control (MAC) addresses, usernames, login information, and/or any other identification information as would be understood by one of ordinary skill in the relevant art(s). In an exemplary embodiment, the mobile device 140.1 can provide one or more of the connected mobile devices 140 (e.g., mobile devices 140.4 and/or 140.5) with the identification information of one or more other connected mobile devices 140 to facilitate the exchange of communications via the mobile device-mobile device relay.

After step 450, the method of flowchart 402 transitions to step 455, where the mobile device 140.4 and the mobile device 140.5 are configured to communicate with each other via the mobile device 140.1, which provides a mobile device-mobile device relay. In operation, the mobile device 140.1 is configured as a router to route communications from the mobile device 140.4 to the mobile device 140.5 and vice versa. In an exemplary embodiment, communications from the mobile devices 140.4 to the mobile device 140.5 (and vice versa) are not communicated to the core network. That is, communications between one mobile device 140 served by the mobile device 140.1 (e.g., mobile device 140.4) and another mobile device 140 served by the mobile device 140.1 (e.g., mobile device 140.5) are directly routed to each other via the mobile device 140.1 configured as a mobile device-mobile device relay. For example, the mobile device 140.1 is configured to route communications from the mobile device 140.4, destined for the IP address corresponding to the mobile device 140.5, to the mobile device 140.5 (and vice versa) using, for example, the IP routing tables. In operation, the mobile device 140.1 determines the destination IP address for incoming communications, determines the corresponding mobile device(s) 140 associated with the destination IP address(es), using, for example, the IP routing table(s), and forwards the communications to the determined mobile device(s) 140. In this example, the communications can be unicast to one mobile device or multicast to two or more mobile devices. The destination IP address for a communication can be determined by examining the packet headers, as will be understood by those skilled in arts.

Figure 5A:
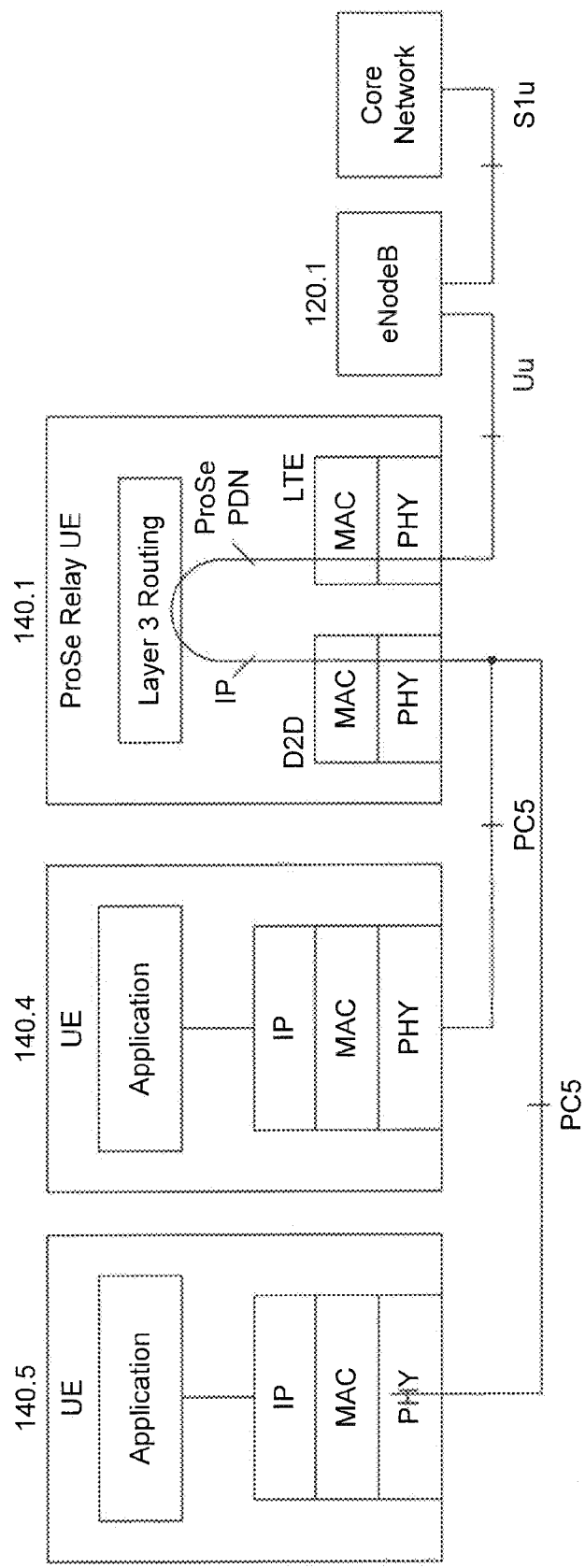
FIG. 5A illustrates a mobile device-to-network relay architecture according to an exemplary embodiment of the present disclosure.

FIG. 5A illustrates a mobile device-to-network relay architecture 500 according to an exemplary embodiment of the present disclosure. In an exemplary embodiment, the mobile device 140.1 is within serving cell or sector 110.1 and served by the base station 120.1. The mobile device 140.1 is configured as a mobile device-to-network relay to route communications between the base station 120.1 and, for example, mobile device 140.4 and/or mobile device 140.5, both of which are outside of the serving cell or sector 110.1 (i.e., not served by the base station 120.1). For example, the mobile device 140.1 routes uplink communications from the mobile device 140.4 and/or the mobile device 140.5 to the base station 120.1, and downlink communications from the base station 120.1 to the mobile device 140.4 and/or the mobile device 140.5.

In an exemplary embodiment, the mobile device 140.1 functioning as a mobile device-to-network relay can utilize Layer 3 routing based on an EPS bearer designated for communications with the mobile device 140.4. That is, the mobile device 140.1 can be configured to create an EPS bearer for communications to/from the mobile device 140.4 (e.g., ProSe relay bearer). The mobile device 140.1 can be configured to create another ProSe relay bearer for communications to/from the mobile device 140.5. In this example, the ProSe relay bearer(s) can be in addition to an EPS bearer utilized by the mobile device 140.1 for its own communicates with the base station 120.1. That is, the mobile device can utilize three bearers—two ProSe relay bearers and one general bearer. In operation, the mobile device 140.1 creates the ProSe relay bearer(s) for respective downlink communications destined for the mobile devices 140.4 and/or 140.5 that are received from the base station 120.1 on a packet data network (PDN) established between the mobile device 140.1 and base station 120.1. The mobile device 140.1 can be configured to identify uplink communications from the mobile devices 140.4 and/or 140.5, and can map the communications to the corresponding ProSe relay bearer for communication to the base station 120.1. As discussed above, the device-to-device communication network established between the mobile device 140.1 and the mobile devices 140.4 and/or 140.5 can utilize one or more communication protocols, including, for example, LTE and/or WLAN. An exemplary operation of the mobile device-to-network relay architecture 500 is discussed in more detail with reference to FIG. 5B.

Figure 5B:
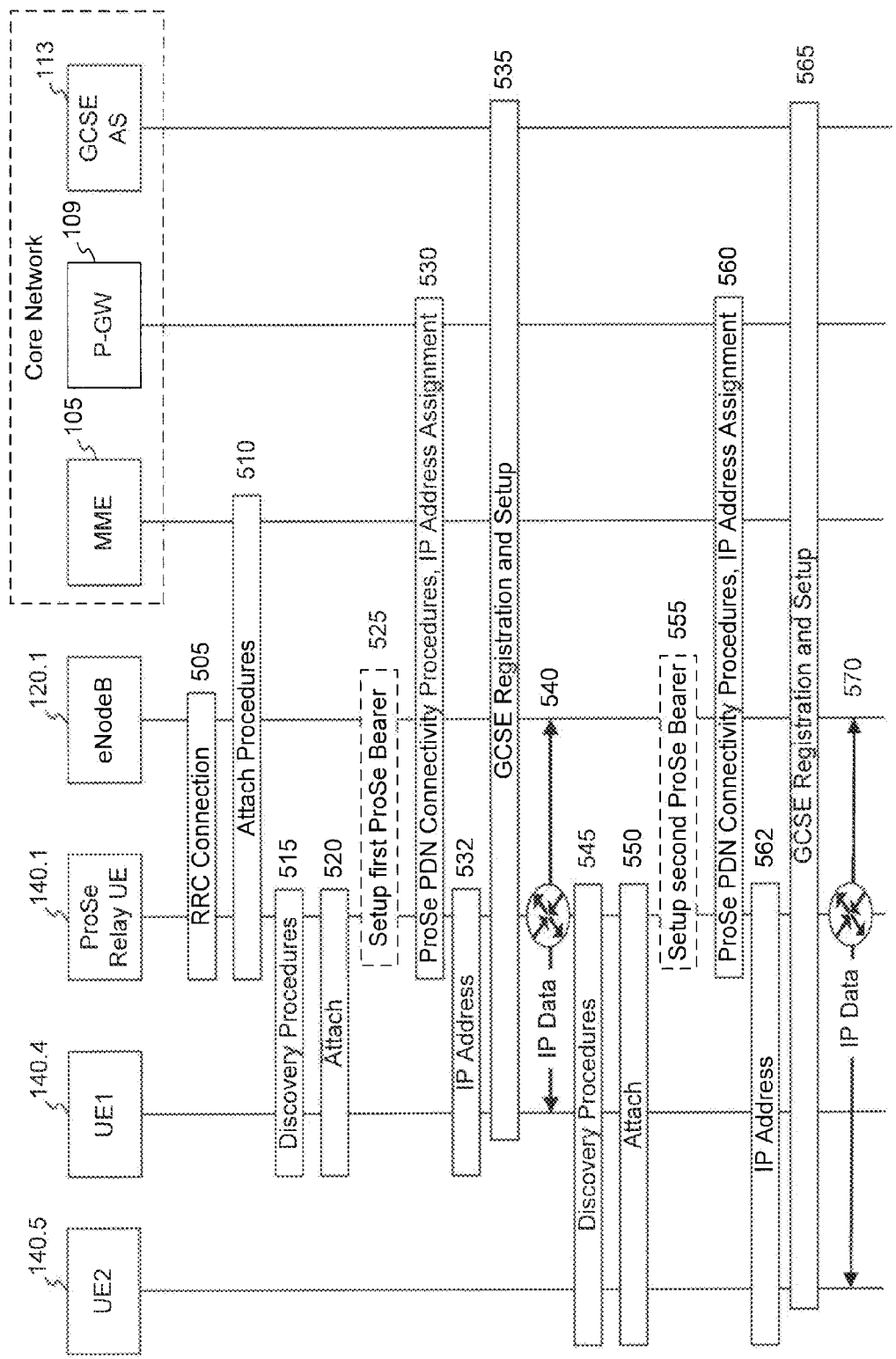
FIG. 5B illustrates a flowchart of a mobile device-to-network relay method according to an exemplary embodiment of the present disclosure.

FIG. 5B illustrates a flowchart 502 of a mobile device-to-network relay method according to an exemplary embodiment of the present disclosure. The method of flowchart 502 is described with continued reference to one or more of FIGS. 1-5A. The steps of the method of flowchart 502 are not limited to the order described below, and the various steps may be performed in a different order. Further, two or more steps of the method of flowchart 502 may be performed simultaneously with each other.

The method of flowchart 502 begins at step 505, where the mobile device 140.1 initiates a radio resource control (RRC) connection to the base station 120.1 by generating an RRC connection request and provides the RRC connection request to the base station 120.1. The RRC connection request can include an SAE temporary mobile subscriber identity (STMSI) and an establishment cause. The STMSI includes information used by the base station 120.1 to identify that the mobile device 140.1 is registered with MME 105. In response to the RRC connection request, the base station 120.1 generates and provides an RRC connection setup message to the mobile device 140.1. The RRC connection setup message informs the mobile device 140.1 that it now has an active connection and the mobile device 140.1 is operating in a connected mode.

After step 505, the method of flowchart 502 transitions to step 510, where the mobile device 140.1 is configured to attach to the base station 120.1 and the MME 105. The attachment of the mobile device 140.1 to the base station 120.1 and the MME 105 associates the mobile device 140.1 with the base station 120.1 and the MME 105. In an exemplary embodiment, the mobile device 140.1 is configured to generate and provide an RRC connection setup complete message to the base station 120.1 to acknowledge the RRC connection setup message. The RRC connection setup complete message can include a service request clause, which is forwarded to the MME 105 by the base station 120.1. The receipt of the service request clause by the MME 105 completes the association of the mobile device 140.1 with the MME 105. The attachment of the mobile device 140.1 to the base station 120.1 creates a packet data network (PDN) to facilitate communication between the mobile device 140.1 and the base station 120.1.

After step 510, the method of flowchart 502 transitions to step 515, where the mobile device 140.4 performs a ProSe discovery procedure to determine available mobile devices (e.g., mobile device 140.1) that are configured to offer proximity services, such as the ability to function as a mobile device-to-network relay. In an exemplary embodiment, the mobile device 140.4 can be configured to perform any well-known scanning procedure to identify prospective devices that may offer proximity services.

After step 515, the method of flowchart 502 transitions to step 520, where the mobile device 140.4 can be configured to generate and provide a ProSe request to the identified device (i.e., mobile device 140.1) that is configured to offer proximity services. In this example, the ProSe request can include a request to attach to the mobile device 140.1 for one or more proximity services.

After step 520, the method of flowchart 502 transitions to step 525, where the mobile device 140.1 is configured to create an EPS bearer (e.g., ProSe relay bearer) for communications to/from the mobile device 140.4 in response to the ProSe request. In an exemplary embodiment, the ProSe relay bearer is created in addition to an EPS bearer utilized by the mobile device 140.1 to communicate with the base station 120.1. In operation, the ProSe relay bearer can be used for downlink communications destined for the mobile device 140.4 that are received from the base station 120.1 on a packet data network (PDN) established between the mobile device 140.1 and base station 120.1 and/or uplink communications from the mobile device 140.4 destined for base station 120.1. The mobile device 140.1 can be configured to identify uplink communications from the mobile device 140.4 and map the communications to the ProSe relay bearer for communication to the base station 120.1. The device-to-device communication network established between the mobile device 140.1 and 140.4 can utilize one or more communication protocols, including, for example, LTE and/or WLAN.

After step 525, the method of flowchart 502 transitions to step 530, where the mobile device 140.1 is configured to perform a proximity services (ProSe) packet data network (PDN) connection procedure to enable the mobile device 140.1 to operate as a mobile device-to-network relay for the mobile device 140.4. In an exemplary embodiment, the mobile device 140.1 generates a ProSe PDN connection request identifying the created ProSe relay bearer and provides the request to the base station 120.1, which forwards the request to the gateway 109. In response to the request, the gateway 109 generates and provides a ProSe PDN connection acknowledgement message to the mobile device 140.1 via the base station 120.1. The ProSe PDN connection acknowledgement message can include identification information—such as one or more internet protocol (IP) addresses—available to the mobile device 140.1 for assignment to prospective mobile device(s) 140 seeking ProSe connection(s) to the mobile device 140.1, where the mobile device 140.1 is acting as a relay.

After step 530, the method of flowchart 502 transitions to step 532, where the mobile device 140.1 is configured to assign an IP address to the mobile devices 140.4 from the IP address(es) included in the identification information of the ProSe PDN connection acknowledgement message. In an exemplary embodiment, the mobile device 140.1 can be configured to generate and provide a ProSe acknowledgement message to the mobile device 140.4 to acknowledge the ProSe request from the mobile device 140.4. The acknowledgement establishes a device-to-device communication network (utilizing, for example, LTE, WLAN, Bluetooth, etc.) to connect to the mobile device 140.4. In an exemplary embodiment, ProSe acknowledgement message includes the IP address assigned to the mobile device 140.4 to facilitate the exchange of communications via the device-to-device communication network.

After step 532, the method of flowchart 502 transitions to step 535, where the mobile device 140.4 is configured to register with the core network to facilitate communication with the core network via the mobile device 140.1. In an exemplary embodiment, the registration can include group communication system enablers (GCSE) registration. In an exemplary embodiment, the mobile device 140.4 registers with server 113 to provide the server 113 with ProSe information, including, for example, the IP address that has been assigned to the mobile device 140.4. In operation, the server 113 can be configured to store and manage ProSe information for one or more mobile devices 140 that have established communications with the core network via one or more of the proximity services (e.g., mobile device-to-network relay). In operation, core network can utilize the ProSe relay bearer for communications destined for the mobile device 140.4 via the mobile device 140.1 functioning as a mobile device-to-network relay.

After step 535, the method of flowchart 502 transitions to step 540, where the mobile device 140.4 is configured to communicate with the base station 120.1 via the mobile device 140.1 functioning as a mobile device-to-network relay. In operation, the mobile device 1401.1 can identify communications received from the base station 120.1 as communications destined for the mobile device 140.4 (i.e., "relay communications") based on the communications being received using the ProSe relay bearer. In this example, the mobile device 140.1 can identify the ProSe relay bearer based on one or more resource elements (REs) and/or resource blocks (RBs) being used for the communication. The mobile device 140.1 can be configured to forward the communications identified as out-of-coverage communications to the mobile device 140.4. Similarly, for communications received from the mobile device 140.4 via the device-to-device communication network, the mobile device 140.1 can be configured to identify such communications as relay communication. In this example, the mobile device 140.1 can identify the received communications based on the source IP address associated with the communications. That is, the mobile device 140.1 can identify that the received communications originated from the mobile device 140.4 by identifying that the source IP address matches the IP address previously assigned to the mobile device 140.4. In an exemplary embodiment, the mobile device 140.1 can generate and/or utilize one or more IP routing tables to process the received communications. The mobile device 140.1 can then be configured to map to the communications to the ProSe relay bearer for communication to the base station 120.1. Here, the base station 120.1 can be configured to identify the communications as coming from the mobile device 140.4 because the communications are carried over the ProSe relay bearer, and therefore the base station 120.1 can determine that such communications are from the out-of-coverage mobile device 140.4.

After step 540, the method of flowchart 502 transitions to step 545, where the mobile device 140.5 performs a ProSe discovery procedure to determine available mobile devices (e.g., mobile device 140.1) that are configured to offer proximity services, such as the ability to function as a mobile device-to-network relay. In an exemplary embodiment, the mobile device 140.5 can be configured to perform any well-known scanning procedure to identify prospective devices that may offer proximity services.

After step 545, the method of flowchart 502 transitions to step 550, the mobile device 140.5 can be configured to generate and provide a ProSe request to the identified device (i.e., mobile device 140.1) that is configured to offer proximity services. In this example, the ProSe request can include a request to attach to the mobile device 140.1 for one or more proximity services.

After step 550, the method of flowchart 502 transitions to step 555, where the mobile device 140.1 is configured to create a second EPS bearer (e.g., second ProSe relay bearer) for communications to/from the mobile device 140.5 in response to the ProSe request. In an exemplary embodiment, the second ProSe relay bearer is in addition to the ProSe relay bearer created in step 525 and the EPS bearer utilized by the mobile device 140.1 for its own communications with the base station 120.1. In operation, the second ProSe relay bearer can be used for downlink communications destined for the mobile device 140.5 that are received from the base station 120.1 on a packet data network (PDN) established between the mobile device 140.1 and base station 120.1 and/or uplink communications from the mobile device 140.5 destined for base station 120.1. The mobile device 140.1 can be configured to identify uplink communications from the mobile device 140.5 and map to the communications to the second ProSe relay bearer for communication to the base station 120.1. The device-to-device communication network established between the mobile device 140.1 and 140.5 can utilize one or more communication protocols, including, for example, LTE and/or WLAN.

After step 555, the method of flowchart 502 transitions to step 560, where the mobile device 140.1 is configured to perform a proximity services (ProSe) packet data network (PDN) connection procedure to enable the mobile device 140.1 to operate as a mobile device-to-network relay for the mobile device 140.5. In an exemplary embodiment, the mobile device 140.1 generates a ProSe PDN connection request identifying the second created ProSe relay bearer and provides the request to the base station 120.1, which forwards the request to the gateway 109. In response to the request, the gateway 109 generates and provides a ProSe PDN connection acknowledgement message to the mobile device 140.1 via the base station 120.1. The ProSe PDN connection acknowledgement message can include identification information—such as one or more internet protocol (IP) addresses—available to the mobile device 140.1 for assignment to prospective mobile device(s) 140 seeking ProSe connection(s) to the mobile device 140.1, where the mobile device 140.1 is acting as a relay.

After step 560, the method of flowchart 502 transitions to step 562, where the mobile device 140.1 is configured to assign an IP address to the mobile devices 140.5 from the IP address(es) included in the identification information of the ProSe PDN connection acknowledgement message. In an exemplary embodiment, the mobile device 140.1 can be configured to generate and provide a ProSe acknowledgement message to the mobile device 140.5 to acknowledge the ProSe request from the mobile device 140.5. The acknowledgement establishes a device-to-device communication network (utilizing, for example, LTE, WLAN, Bluetooth, etc.) to connect to the mobile device 140.5. In an exemplary embodiment, ProSe acknowledgement message includes the IP address assigned to the mobile device 140.5 to facilitate the exchange of communications via the device-to-device communication network.

After step 562, the method of flowchart 502 transitions to step 565, where the mobile device 140.5 is configured to register with the core network to facilitate communication with the core network via the mobile device 140.1. In an exemplary embodiment, the registration can include group communication system enablers (GCSE) registration. In an exemplary embodiment, the mobile device 140.5 registers with server 113 to provide the server 113 with ProSe information, including, for example, the IP address that has been assigned to the mobile device 140.5. In operation, the server 113 can be configured to store and manage ProSe information for one or more mobile devices 140 that have established communications with the core network via one or more of the proximity services (e.g., mobile device-to-network relay). In operation, core network can utilize the second ProSe relay bearer for communications destined for the mobile device 140.5 via the mobile device 140.1 functioning as a mobile device-to-network relay.

After step 565, the method of flowchart 502 transitions to step 570, where the mobile device 140.5 is configured to communicate with the base station 120.1 via the mobile device 140.1 functioning as a mobile device-to-network relay. In operation, the mobile device 1401.1 can identify communications received from the base station 120.1 as communications destined for the mobile device 140.5 (i.e., "relay communications") based on the communications being received over the second ProSe relay bearer. In this example, the mobile device 140.1 can be configured to forward the communications identified as out-of-coverage communications to the mobile device 140.5. Similarly, for communications received from the mobile device 140.5 via the device-to-device communication network, the mobile device 140.1 can be configured to identify such communications as relay communication. In this example, the mobile device 140.1 can identify the received communications based on the source IP address associated with the communications. That is, the mobile device 140.1 can identify that the received communications originated from the mobile device 140.5 by identifying that the source IP address matches the IP address previously assigned to the mobile device 140.5. In an exemplary embodiment, the mobile device 140.1 can utilize one or more IP routing tables to process the received communications. The mobile device 140.1 can then be configured to map to the communications to the ProSe relay bearer for communication to the base station 120.1. Here, the base station 120.1 can be configured to identify the communications as coming from the mobile device 140.5 because the communications are carried over the second ProSe relay bearer, and therefore the base station 120.1 can determine that such communications are from the out-of-coverage mobile device 140.5.

Figure 6A:
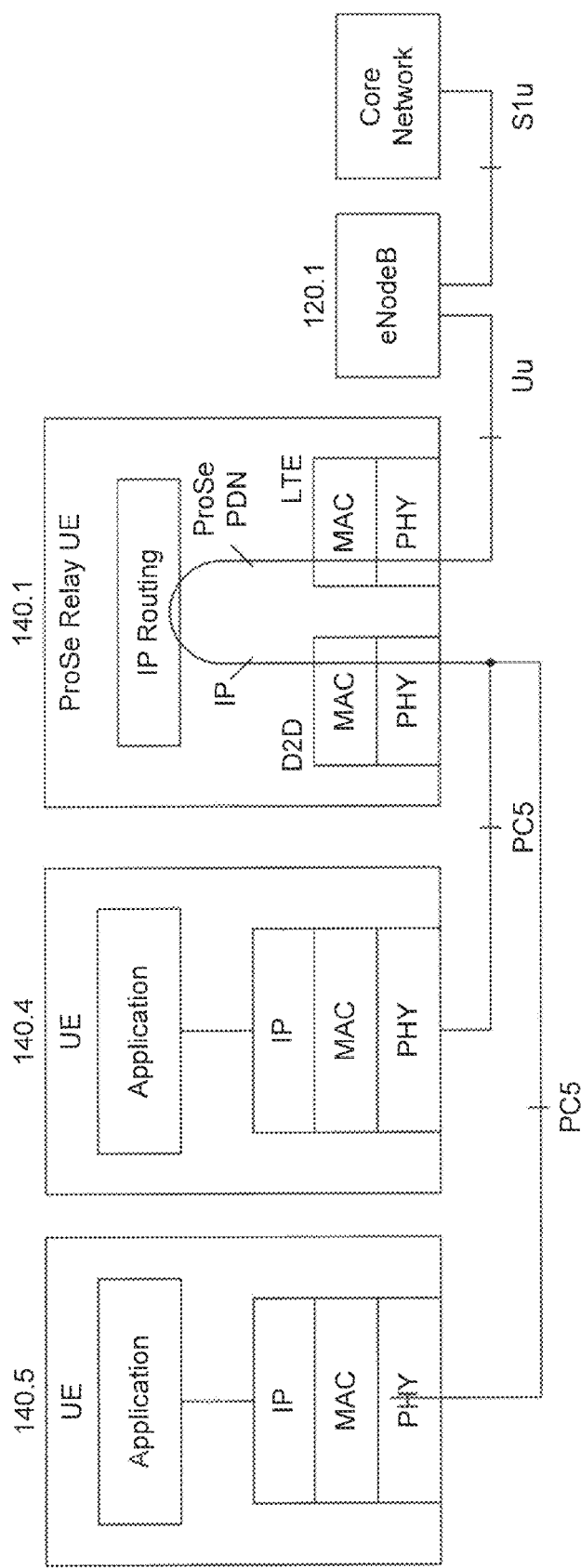
FIG. 6A illustrates a mobile device-to-network relay architecture according to an exemplary embodiment of the present disclosure.

FIG. 6A illustrates a mobile device-to-network relay architecture 600 according to an exemplary embodiment of the present disclosure. In an exemplary embodiment, the mobile device 140.1 is within serving cell or sector 110.1 and served by the base station 120.1. The mobile device 140.1 is configured as a mobile device-to-network relay to route communications between the base station 120.1 and, for example, mobile device 140.4 and/or mobile device 140.5, which are outside of the serving cell or sector 110.1 (i.e., not served by the base station 120.1). For example, the mobile device 140.1 routes uplink communications from the mobile device 140.4 and/or the mobile device 140.5 to the base station 120.1, and downlink communications from the base station 120.1 to the mobile device 140.4 and/or the mobile device 140.5.

In an exemplary embodiment, the mobile device 140.1 functioning as a mobile device-to-network relay can utilize internet protocol (IP) routing and/or IP forwarding. The use of IP routing and/or IP forwarding may be utilized in conjunction with one or more EPS bearers designated for communications with the mobile device 140.4 and/or the mobile device 140.5 (e.g., ProSe relay bearer). For example, two or more mobile devices not within the serving cell or sector 110.1 (e.g., mobile devices 140.4 and 140.5) can share a ProSe relay bearer by using IP routing and/or IP forwarding. That is, the mobile device 140.1 can be configured to utilize IP routing and/or IP forwarding to route communications between two or more remote mobile devices (e.g., mobile devices 140.4 and 140.5) utilizing a shared ProSe relay bearer.

In addition to the shared ProSe relay bearer, the mobile device 140.1 can be configured to create an EPS bearer utilized by the mobile device 140.1 for its own communications with the base station 120.1. In operation, the mobile device 140.1 creates the shared ProSe relay bearer for downlink communications destined for the mobile device 140.4 and/or the mobile device 140.5 that are received from the base station 120.1 on a packet data network (PDN) established between the mobile device 140.1 and base station 120.1. The mobile device 140.1 can be configured to identify uplink communications from the mobile device 140.4 and/or the mobile device 140.5 and can map the communications to the ProSe relay bearer for communication to the base station 120.1. As discussed above, the device-to-device communication network established between the mobile device 140.1 and the mobile devices 140.4 and/or 140.5 can utilize one or more communication protocols, including, for example, LTE and/or WLAN. An exemplary operation of the mobile device-to-network relay architecture 600 is discussed in more detail with reference to FIG. 6B.

Figure 6B:
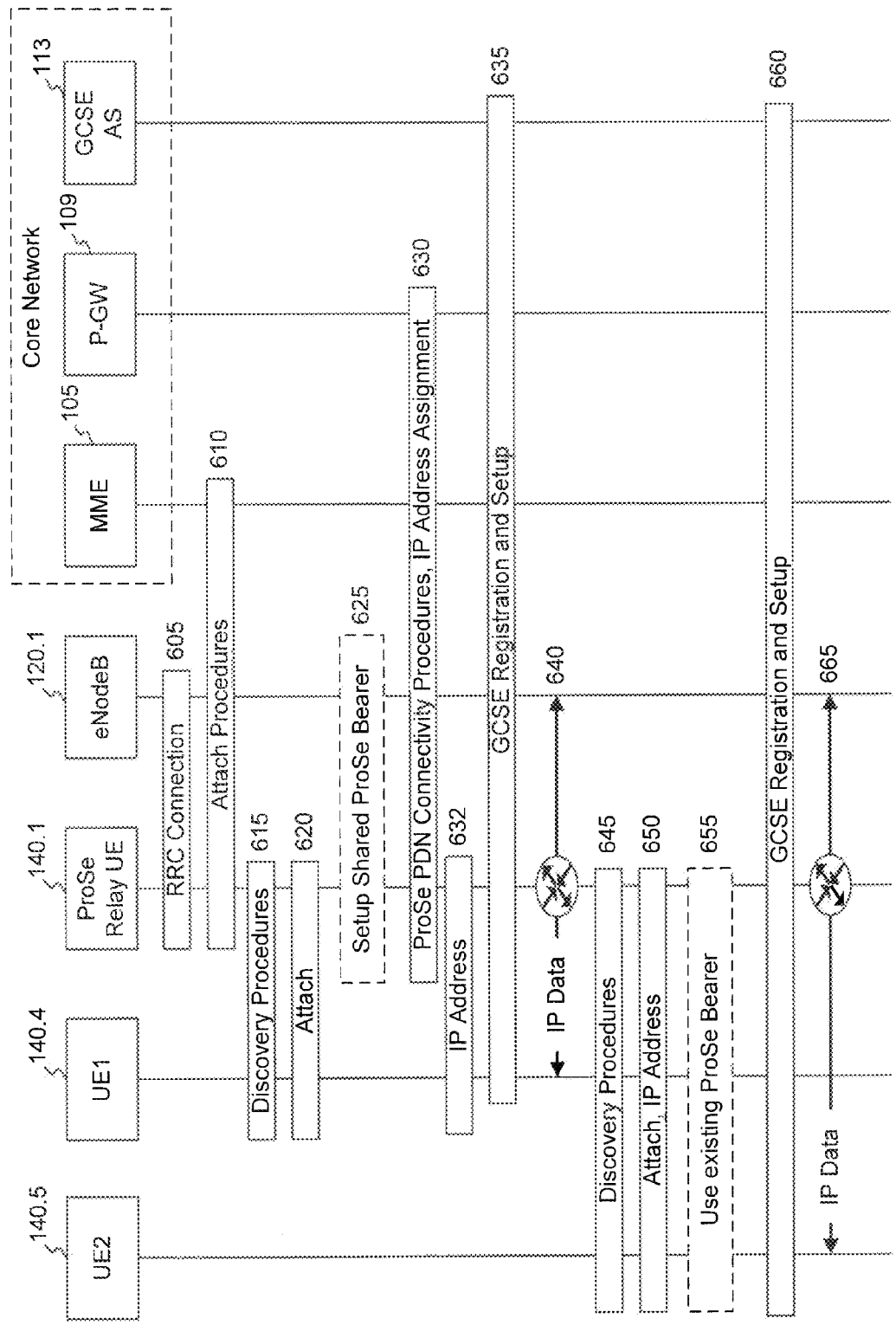
FIG. 6B illustrates a flowchart of a mobile device-to-network relay method according to an exemplary embodiment of the present disclosure.

FIG. 6B illustrates a flowchart 602 of a mobile device-to-mobile device relay method according to an exemplary embodiment of the present disclosure. The method of flowchart 602 is described with continued reference to one or more of FIGS. 1-6A. The steps of the method of flowchart 602 are not limited to the order described below, and the various steps may be performed in a different order. Further, two or more steps of the method of flowchart 602 may be performed simultaneously with each other.

The method of flowchart 602 begins at step 605, where the mobile device 140.1 initiates a radio resource control (RRC) connection to the base station 120.1 by generating an RRC connection request and provides the RRC connection request to the base station 120.1. The RRC connection request can include an SAE temporary mobile subscriber identity (STMSI) and an establishment cause. The STMSI includes information used by the base station 120.1 to identify that the mobile device 140.1 is registered with MME 105. In response to the RRC connection request, the base station 120.1 generates and provides an RRC connection setup message to the mobile device 140.1. The RRC connection setup message informs the mobile device 140.1 that it now has an active connection and the mobile device 140.1 is operating in a connected mode.

After step 605, the method of flowchart 602 transitions to step 610, where the mobile device 140.1 is configured to attach to the base station 120.1 and the MME 105. The attachment of the mobile device 140.1 to the base station 120.1 and the MME 105 associates the mobile device 140.1 with the base station 120.1 and the MME 105. In an exemplary embodiment, the mobile device 140.1 is configured to generate and provide an RRC connection setup complete message to the base station 120.1 to acknowledge the RRC connection setup message. The RRC connection setup complete message can include a service request clause, which is forwarded to the MME 105 by the base station 120.1. The receipt of the service request clause by the MME 105 completes the association of the mobile device 140.1 with the MME 105. The attachment of the mobile device 140.1 to the base station 120.1 creates a packet data network (PDN) to facilitate communication between the mobile device 140.1 and the base station 120.1.

After step 610, the method of flowchart 602 transitions to step 615, where the mobile device 140.4 performs a ProSe discovery procedure to determine any available mobile devices, namely mobile device 140.1, that are configured to offer proximity services, such as the ability to function as a mobile device-to-network relay. In an exemplary embodiment, the mobile device 140.4 can be configured to perform any well-known scanning procedure to identify prospective devices that may offer proximity services.

After step 615, the method of flowchart 602 transitions to step 620, where the mobile device 140.4 can be configured to generate and provide a ProSe request to the identified device (i.e., mobile device 140.1) that is configured to offer proximity services. In this example, the ProSe request can include a request to attach to the mobile device 140.1 for one or more proximity services.

After step 620, the method of flowchart 602 transitions to step 625, where the mobile device 140.1 is configured to create a shared EPS bearer (e.g., ProSe relay bearer) for communications to/from one or more mobile devices, including, for example, mobile device 140.4 in response to the ProSe request. In an exemplary embodiment, the shared ProSe relay bearer is in addition to an EPS bearer utilized by the mobile device 140.1 for its own communications with the base station 120.1. In operation, the shared ProSe relay bearer can be used for downlink communications destined for the mobile device 140.4 that are received from the base station 120.1 on a packet data network (PDN) established between the mobile device 140.1 and base station 120.1 and/or uplink communications from the mobile device 140.4 destined for base station 120.1. The mobile device 140.1 can be configured to identify uplink communications from the mobile device 140.4 and map the communications to the shared ProSe relay bearer for communication to the base station 120.1. The device-to-device communication network established between the mobile device 140.1 and 140.4 can utilize one or more communication protocols, including, for example, LTE and/or WLAN.

After step 625, the method of flowchart 602 transitions to step 630, where the mobile device 140.1 is configured to perform a proximity services (ProSe) packet data network (PDN) connection procedure to enable the mobile device 140.1 to operate as a mobile device-to-network relay for the mobile device 140.4. In an exemplary embodiment, the mobile device 140.1 generates a ProSe PDN connection request identifying the created ProSe relay bearer and provides the request to the base station 120.1, which forwards the request to the gateway 109. In response to the request, the gateway 109 generates and provides a ProSe PDN connection acknowledgement message to the mobile device 140.1 via the base station 120.1. The ProSe PDN connection acknowledgement message can include identification information—such as one or more internet protocol (IP) addresses—available to the mobile device 140.1 for assignment to prospective mobile device(s) 140 seeking ProSe connection(s) to the mobile device 140.1.

After step 630, the method of flowchart 602 transitions to step 632, where the mobile device 140.1 is configured to assign an IP address to the mobile devices 140.4 from the IP address(es) included in the identification information of the ProSe PDN connection acknowledgement message. In an exemplary embodiment, the mobile device 140.1 can be configured to generate and provide a ProSe acknowledgement message to the mobile device 140.4 to acknowledge the ProSe request from the mobile device 140.4. The acknowledgement establishes a device-to-device communication network (utilizing, for example, LTE, WLAN, Bluetooth, etc.) to connect to the mobile device 140.4. In an exemplary embodiment, ProSe acknowledgement message includes the IP address assigned to the mobile device 140.4 to facilitate the exchange of communications via the device-to-device communication network.

After step 630, the method of flowchart 602 transitions to step 635, where the mobile device 140.4 is configured to register with the core network to facilitate communication with the core network via the mobile device 140.1. In an exemplary embodiment, the registration can include group communication system enablers (GCSE) registration. In an exemplary embodiment, the mobile device 140.4 registers with server 113 to provide the server 113 with ProSe information, including, for example, the IP address that has been assigned to the mobile device 140.4. In operation, the server 113 can be configured to store and manage ProSe information for one or more mobile devices 140 that have established communications with the core network via one or more of the proximity services (e.g., mobile device-to-network relay). The core network can utilize the shared ProSe relay bearer for communications destined for the mobile device 140.4 via the mobile device 140.1 functioning as a mobile device-to-network relay.

After step 635, the method of flowchart 602 transitions to step 640, where the mobile device 140.4 is configured to communicate with the base station 120.1 via the mobile device 140.1 functioning as a mobile device-to-network relay. In operation, the mobile device 140.1 can identify communications received from the base station 120.1 as communications destined for the mobile device 140.4 (i.e., "relay communications") based on the reception of the communications via the shared ProSe relay bearer. In an exemplary embodiment, the mobile device 140.1 can be configured to also identify the communications as relay communications based on the destination IP address(es) associated with the communications. In this example, because the shared ProSe relay bearer can be shared with two or more out-of-coverage mobile devices (e.g., mobile devices 140.4 and 140.5), the mobile device 140.1 can be configured to differentiate between the communications associated with the out-of-coverage mobile devices based on the IP address(es) associated with the communications. That is, the mobile device 140.1 can identify that the communications received from the base station 120.1 are intended for, for example, the mobile device 140.4 by identifying that the destination IP address associated with the communication matches the IP address that was previously assigned to the mobile device 140.4 and registered with the core network. The mobile device 140.1 can then forward the communications identified as out-of-coverage communications to the appropriate mobile device based on the IP address. If only a single mobile device (e.g., mobile device 140.4) is connected to the mobile device 140.1 functioning as the relay, the mobile device 140.1 can route communications based on the bearer. For example, the mobile device 140.1 can route communications to the mobile device 140.4 when the ProSe relay bearer is utilized. In contrast, communications from the base station 120.1 on a second bearer terminate at the mobile device 140.1 because this second bearer is used for communications intended for the mobile device 140.1, and not for relay. When two or more out-of-coverage mobile devices are using the mobile device 140.1 as a relay, the identification and routing can be based on IP address, or a combination of IP addresses and the bearer being utilized for the communications. In an exemplary embodiment, the mobile device 140.1 can be configured to generate and/or utilize one or more IP routing tables to process the communications.

Similarly, for communications received from the mobile device 140.4 via the device-to-device communication network, the mobile device 140.1 can be configured to identify such communications as relay communication. In this example, the mobile device 140.1 can identify the received communications based on the source IP address associated with the communications. That is, the mobile device 140.1 can identify that the received communications originated from the mobile device 140.4 by identifying that the source IP address matches the IP address previously assigned to the mobile device 140.4. If only a single mobile device (e.g., mobile device 140.4) is connected to the mobile device 140.1 functioning as the relay, the mobile device 140.1 identify and route the communications based on the bearer. For example, the mobile device 140.1 can identify that the communications are received from the out-of-coverage mobile device when the ProSe relay bearer is utilized. The mobile device 140.1 can then be configured to map the communications to the ProSe relay bearer for communication to the base station 120.1. In an exemplary embodiment, the mobile device 140.1 can utilize one or more IP routing tables to process the communications.

After step 640, the method of flowchart 602 transitions to step 645, where the mobile device 140.5 performs a ProSe discovery procedure to determine available mobile devices (e.g., mobile device 140.1) that are configured to offer proximity services, such as the ability to function as a mobile device-to-network relay. In an exemplary embodiment, the mobile device 140.5 can be configured to perform any well-known scanning procedures to identify prospective devices that may offer proximity services.

After step 645, the method of flowchart 602 transitions to step 650, where the mobile device 140.5 can be configured to generate and provide a ProSe request to the identified device (i.e., mobile device 140.1). In this example, the ProSe request can include a request to attach to the mobile device 140.1 for one or more proximity services. In response to the ProSe request, the mobile device 140.1 can be configured to acknowledge the ProSe request from the mobile device 140.5 and to establish a device-to-device communication network (utilizing, for example, LTE, WLAN, Bluetooth, etc.) to connect to the mobile device 140.5. In an exemplary embodiment, the mobile device 140.1 can be configured to assign an IP address to the mobile devices 140.5 from the IP address(es) included in the identification information of the ProSe PDN connection acknowledgement message of step 630. The mobile device 140.1 can then be configured to generate and provide a ProSe request acknowledgment message to the mobile device 140.5. The ProSe request acknowledgment message can include the IP address assigned to the mobile device 140.5 to facilitate the exchange of communications via the device-to-device communication network. In an exemplary embodiment, the ProSe request acknowledgement message can identify that the mobile device 140.1 is configured to operate as a mobile device-to-network relay for the mobile device 140.5. In this example, the mobile device 140.1 has already completed the proximity services (ProSe) packet data network (PDN) connection procedure to enable the mobile device 140.1 to operate as a mobile device-to-network relay in step 630.

After step 650, the method of flowchart 602 transitions to step 655, where the mobile device 140.1 can be configured to utilize the previously created shared EPS bearer (e.g., ProSe relay bearer) for communications to/from the mobile device 140.5. In operation, the shared ProSe relay bearer can be used for downlink communications destined for the mobile device 140.5 that are received from the base station 120.1 on the packet data network (PDN) established between the mobile device 140.1 and base station 120.1, and/or for uplink communications from the mobile device 140.5 destined for base station 120.1. The mobile device 140.1 can be configured to identify uplink communications from the mobile device 140.4 and map the communications to the shared ProSe relay bearer for communication to the base station 120.1. The device-to-device communication network established between the mobile device 140.1 and 140.4 can utilize one or more communication protocols, including, for example, LTE and/or WLAN.

After step 655, the method of flowchart 602 transitions to step 660, where the mobile device 140.5 is configured to register with the core network to facilitate communication with the core network via the mobile device 140.1. In an exemplary embodiment, the registration can include group communication system enablers (GCSE) registration. In an exemplary embodiment, the mobile device 140.5 registers with server 113 to provide the server 113 with ProSe information, including, for example, the IP address that has been assigned to the mobile device 140.5. In operation, the server 113 can be configured to store and manage ProSe information for one or more mobile devices 140 that have established communications with the core network via one or more of the proximity services (e.g., mobile device-to-network relay). In operation, core network can utilize the shared ProSe relay bearer for communications destined for the mobile device 140.5 via the mobile device 140.1 functioning as a mobile device-to-network relay.

After step 660, the method of flowchart 602 transitions to step 665, where the mobile device 140.5 is configured to communicate with the base station 120.1 via the mobile device 140.1 functioning as a mobile device-to-network relay similar to the operation in step 640 by the mobile device 140.4. In operation, the mobile device 140.1 can identify communications received from the base station 120.1 as relay communications destined for the mobile device 140.5 based on the reception of the communications via the shared ProSe relay bearer. In an exemplary embodiment, the mobile device 140.1 can be configured to also identify the communications as relay communications based on the destination IP address associated with the communications. In this example, because the shared ProSe relay bearer is shared with the mobile device 140.4, the mobile device 140.1 can be configured to identify and route the communications to the corresponding out-of-coverage mobile device based on the IP address associated with the communications. That is, the mobile device 140.1 can identify that the communications received from the base station 120.1 are intended for the mobile device 140.5 and/or the mobile device 140.4 by comparing the destination IP address to the assigned IP addresses associated with the mobile devices 140.5 and/or 140.4. The mobile device 140.1 can then forward the communications identified as out-of-coverage communications to the appropriate mobile device(s) based on the IP address. Communications from the base station 120.1 on a second bearer terminate at the mobile device 140.1 because this second bearer is used for communications intended for the mobile device 140.1, and not for relay.

Similarly, for communications received from the mobile device 140.5 via the device-to-device communication network, the mobile device 140.1 can be configured to identify such communications as relay communication. In this example, the mobile device 140.1 can identify the received communications based on the source IP address associated with the communications. That is, the mobile device 140.1 can identify that the received communications originated from the mobile device 140.5 by identifying that the source IP address matches the IP address previously assigned to the mobile device 140.5. The mobile device 140.1 can then be configured to map to the communications to the ProSe relay bearer for communication to the base station 120.1. In an exemplary embodiment, the mobile device 140.1 can utilize one or more IP routing tables to process the communications.

Figure 7A:
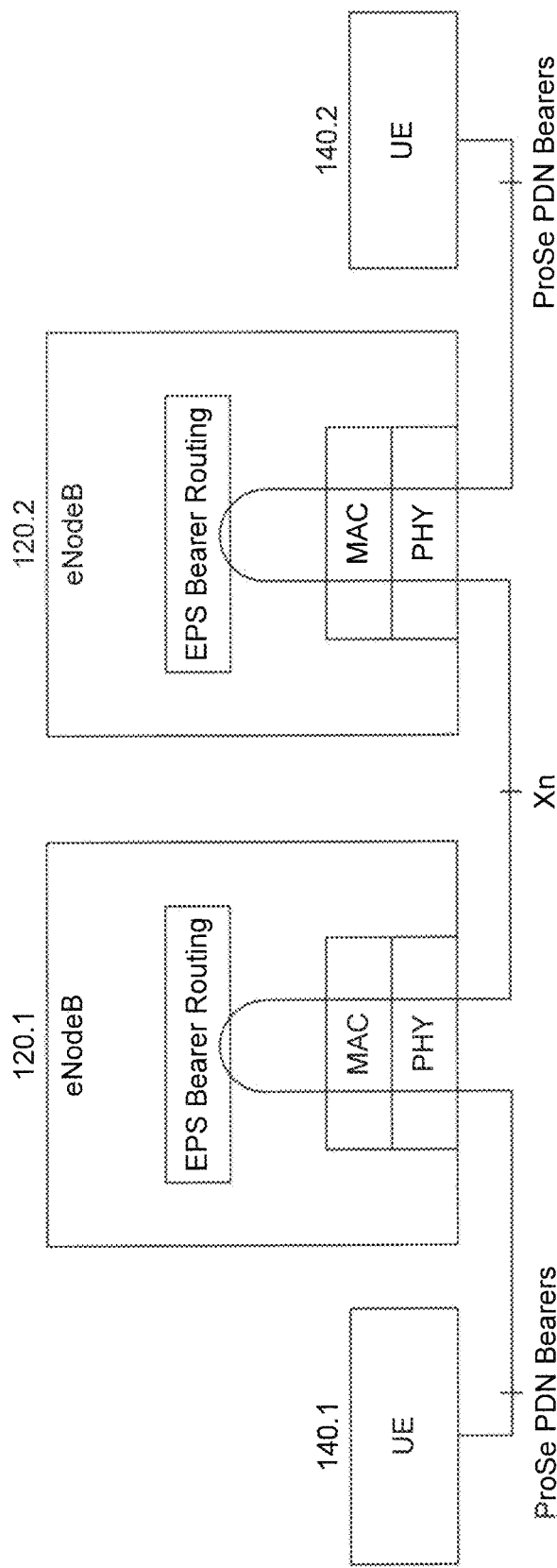
FIG. 7A illustrates an inter-base station relay architecture according to an exemplary embodiment of the present disclosure.

FIG. 7A illustrates an inter-base station relay architecture 700 according to an exemplary embodiment of the present disclosure. In an exemplary embodiment, the mobile device 140.1 is within serving cell or sector 110.1 and served by the base station 120.1. The base station 120.1 is communicatively coupled to base station 120.2 via one or more backhaul connections—such as an Xn interface, and the base station 120.2 serves mobile device 140.2 within serving cell or sector 110.2. In operation, the inter-base station routing architecture 700 facilitates communication between the mobile device 140.1 and the mobile device 140.2 via the base station-to-base station connection. That is, the base station 120.1 and/or the base station 120.2 are configured as inter-base station relays to route communications between each other via the backhaul connection(s) to facilitate the exchange of communications between two or more mobile devices 140 served by the base station 120.1 and the base station 120.2. For example, the base station 120.1 routes communications from the mobile device 140.1 to the mobile device 140.2 via the base station 120.2 along the back haul connection(s) and/or the base station 120.2 routes communications from the mobile device 140.2 to the mobile device 140.1 via the base station 120.1 along the back haul connection(s).

In an exemplary embodiment, the base station 120.1 and/or the base station 120.2 functioning as an inter-base station relay can utilize EPS bearer routing. For example, communications with the mobile device 140.1 (via base station 120.1) can utilize a first EPS bearer, and communications with the mobile device 140.2 (the base station 120.2) can utilize a second EPS bearer. That is, the base station 120.1 can be configured to create a first EPS bearer for communications to/from the mobile device 140.1 (e.g., a first ProSe relay bearer) and the base station 120.2 can be configured to create a second EPS bearer for communications to/from the mobile device 140.2 (e.g., a second ProSe relay bearer). In operation, the base station 120.1 creates the first ProSe relay bearer for communications with mobile device 140.1 on a packet data network (PDN) established between the mobile device 140.1 and base station 120.1, while the base station 120.2 creates the second ProSe relay bearer for communications with mobile device 140.2 on another packet data network (PDN) established between the mobile device 140.2 and base station 120.2.

The base station 120.1 and/or the base station 120.2 can be configured to establish the Xn interface between the base stations 120.1 and 120.2 to facilitate the routing of communications between the mobile devices 140.1 and 140.2. In operation, the base station 120.1 can be configured to map the first ProSe relay bearer to the Xn interface and base station 120.2 can be configured to map the second ProSe relay bearer to the Xn interface. That is, base station 120.1 can be configured to map communications received on the first ProSe relay bearer that are intended for the mobile device 140.2 to an IP address associated with the mobile device 140.2. Upon receipt of the communications mapped to the IP associated with the mobile device 140.2, the base station 120.2 can be configured to map the communications to the second ProSe relay bearer and transmit the communications to the mobile device 140.2. A similar process can be performed by the base station 120.2 for communications received on the second ProSe relay bearer that are intended for the mobile device 140.1. An exemplary operation of the mobile device-to-network relay architecture 500 is discussed in more detail with reference to FIG. 7B.

Figure 7B:
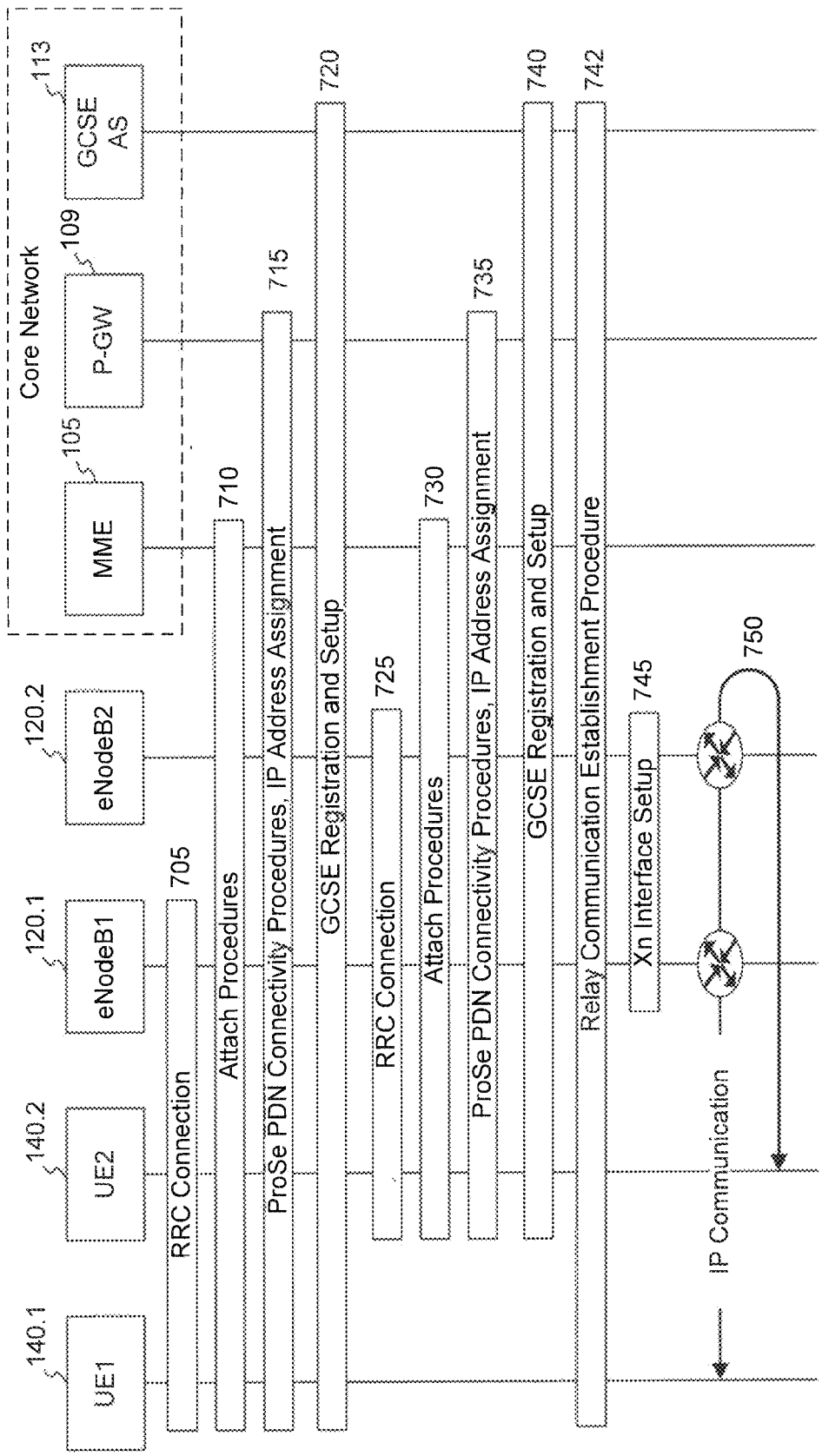
FIG. 7B illustrates a flowchart of an inter-base station relay method according to an exemplary embodiment of the present disclosure.

FIG. 7B illustrates a flowchart 702 of an inter-base station relay method according to an exemplary embodiment of the present disclosure. The method of flowchart 702 is described with continued reference to one or more of FIGS. 1-7A. The steps of the method of flowchart 702 are not limited to the order described below, and the various steps may be performed in a different order. Further, two or more steps of the method of flowchart 702 may be performed simultaneously with each other.

The method of flowchart 702 begins at step 705, where the mobile device 140.1 initiates a radio resource control (RRC) connection to the base station 120.1 by generating an RRC connection request and provides the RRC connection request to the base station 120.1. The RRC connection request can include an SAE temporary mobile subscriber identity (STMSI) and an establishment cause. The STMSI includes information used by the base station 120.1 to identify that the mobile device 140.1 is registered with MME 105. In response to the RRC connection request, the base station 120.1 generates and provides an RRC connection setup message to the mobile device 140.1. The RRC connection setup message informs the mobile device 140.1 that it now has an active connection and the mobile device 140.1 is operating in a connected mode.

After step 705, the method of flowchart 702 transitions to step 710, where the mobile device 140.1 is configured to attach to the base station 120.1 and the MME 105. The attachment of the mobile device 140.1 to the base station 120.1 and the MME 105 associates the mobile device 140.1 with the base station 120.1 and the MME 105. In an exemplary embodiment, the mobile device 140.1 is configured to generate and provide an RRC connection setup complete message to the base station 120.1 to acknowledge the RRC connection setup message. The RRC connection setup complete message can include a service request clause, which is forwarded to the MME 105 by the base station 120.1. The receipt of the service request clause by the MME 105 completes the association of the mobile device 140.1 with the MME 105.

After step 710, the method of flowchart 702 transitions to step 715, where the mobile device 140.1 performs a ProSe discovery procedure to determine if the base station 120.1 is configured to offer proximity services, such as the ability to function as an inter-base station relay. In an exemplary embodiment, the mobile device 140.1 can be configured to generate and provide a ProSe request to the base station 120.1. In response to the ProSe request, the base station 120.1 can be configured to perform a proximity services (ProSe) packet data network (PDN) connection procedure to enable the base station 120.1 to operate as an inter-base station relay. The PDN connection procedure creates a ProSe packet data network (PDN) to facilitate communication between the mobile device 140.1 and one or more other mobile devices, including, for example, mobile device 140.2 via the inter-base station relay. In an exemplary embodiment, the base station 120.1 generates a ProSe PDN connection request and provides the request to the gateway 109. In response to the request, the gateway 109 generates and provides a ProSe PDN connection acknowledgement message to the mobile device 140.1 via the base station 120.1. The ProSe PDN connection acknowledgement message can include the IP address assigned to the mobile device 140.1 to facilitate the exchange of communications via the inter-base station relay. This IP address may be different from a second IP address assigned to the mobile device 140.1 for communications originating from the core network, (e.g. not using the inter base station relay).

After step 715, the method of flowchart 702 transitions to step 720, where the mobile device 140.1 is configured to register with the core network to facilitate communication with the core network via the base station 120.1. In an exemplary embodiment, the registration can include group communication system enablers (GCSE) registration. In an exemplary embodiment, the mobile device 140.1 registers with server 113 to provide the server 113 with ProSe information, including, for example, the IP address that has been assigned to the mobile device 140.1. In operation, the server 113 can be configured to store and manage ProSe information for one or more mobile devices 140 that have established communications with the core network via one or more of the proximity services (e.g., inter-base station relay).

After step 720, the method of flowchart 702 transitions to step 725, where the mobile device 140.2 initiates a radio resource control (RRC) connection to the base station 120.2 by generating an RRC connection request and provides the RRC connection request to the base station 120.2. The RRC connection request can include an SAE temporary mobile subscriber identity (STMSI) and an establishment cause. The STMSI includes information used by the base station 120.2 to identify that the mobile device 140.2 is registered with MME 105. In response to the RRC connection request, the base station 120.2 generates and provides an RRC connection setup message to the mobile device 140.2. The RRC connection setup message informs the mobile device 140.2 that it now has an active connection and the mobile device 140.2 is operating in a connected mode.

After step 725, the method of flowchart 700 transitions to step 730, where the mobile device 140.2 is configured to attach to the base station 120.2 and the MME 105. The attachment of the mobile device 140.2 to the base station 120.2 and the MME 105 associates the mobile device 140.2 with the base station 120.2 and the MME 105. In an exemplary embodiment, the mobile device 140.2 is configured to generate and provide an RRC connection setup complete message to the base station 120.2 to acknowledge the RRC connection setup message. The RRC connection setup complete message can include a service request clause, which is forwarded to the MME 105 by the base station 120.2. The receipt of the service request clause by the MME 105 completes the association of the mobile device 140.2 with the MME 105.

After step 730, the method of flowchart 702 transitions to step 735, where the mobile device 140.2 performs a ProSe discovery procedure to determine if the base station 120.2 is configured to offer proximity services, such as the ability to function as an inter-base station relay. In an exemplary embodiment, the mobile device 140.2 can be configured to generate and provide a ProSe request to the base station 120.2. In response to the ProSe request, the base station 120.2 can be configured to perform a proximity services (ProSe) packet data network (PDN) connection procedure to enable the base station 120.2 to operate as an inter-base station relay. The PDN connection procedure creates a ProSe packet data network (PDN) to facilitate communication between the mobile device 140.2 and one or more other mobile devices, including, for example, mobile device 140.2 via the inter-base station relay. In an exemplary embodiment, the base station 120.2 generates a ProSe PDN connection request and provides the request to the gateway 109. In response to the request, the gateway 109 generates and provides a ProSe PDN connection acknowledgement message to the mobile device 140.2 via the base station 120.2. The ProSe PDN connection acknowledgement message can include the IP address assigned to the mobile device 140.2 to facilitate the exchange of communications via the inter-base station relay. This IP address may be different from a second IP address assigned to the mobile device 140.2 for communications originating from the core network, (e.g. not using the inter base station relay).

After step 735, the method of flowchart 702 transitions to step 740, where the mobile device 140.2 is configured to register with the core network to facilitate communication with the core network via the base station 120.2. In an exemplary embodiment, the registration can include group communication system enablers (GCSE) registration. In an exemplary embodiment, the mobile device 140.2 registers with server 113 to provide the server 113 with ProSe information, including, for example, the IP address that has been assigned to the mobile device 140.2. In operation, the server 113 can be configured to store and manage ProSe information for one or more mobile devices 140 that have established communications with the core network via one or more of the proximity services (e.g., inter-base station relay).

After step 740, the method of flowchart 702 transitions to step 742, where a relay communication establishment procedure is performed to facilitate the exchange of communications between the mobile devices 140.1 and 140.2 via the Xn interface. In an example operation, the relay communication establishment procedure includes a first mobile device 140 (e.g., mobile device 140.1) requesting an IP address that corresponds to a second mobile device 140 (e.g., mobile device 140.2) in which the first mobile device 140 intends to initiate communications with from the core network (e.g., server 113). The request can utilize, for example, identification information associated with the intended mobile device 140. The identification information can include, for example, one or more phone numbers, email addresses, International Mobile Station Equipment Identities (IMEI), International mobile subscriber identities (IMSI), media access control (MAC) addresses, usernames, login information, and/or any other identification information as would be understood by one of ordinary skill in the relevant art(s). In an exemplary embodiment, the server 113 is configured to store the identification information and corresponding IP addresses. Further, the server 113 can be configured to store the identification information and corresponding IP addresses in one or more IP routing tables.

In operation, the mobile device 140.1 can be configured transmit the phone number associated with the mobile device 140.2 to the server 113 via the base station 120.1, and request a corresponding IP address associated with the mobile device's phone number. The server 113 can be configured to provide the corresponding IP address to the mobile device 140.1. A similar operation can be performed for an initial communication by the mobile device 140.2 intended for the mobile device 140.1. After receiving the corresponding IP address, the mobile device 140.1 can transmit communications to the mobile device 140.2 based on the provided IP address. This communication can include the IP address of the source of the communication (i.e., the IP address of the mobile device 140.1), which can be used by the mobile device 140.2 for any subsequent communications to the mobile device 140.1.

After step 742, the method of flowchart 702 transitions to step 745, where the base station 120.1 and the base station 120.2 create the Xn interface to establish inter-base station relay. In operation, the inter-base station relay utilizes the IP addresses assigned to the mobile devices 140.1 and 140.2 to route communications between the mobile devices 140.1 and 140.2 via the Xn interface. In an exemplary embodiment, the base station 120.1 and/or the base station 120.2 can utilize IP routing tables that include the IP addresses assigned to the mobile devices accessing the Xn interface. The IP routing tables can include (but are not limited to), for example, identification information of the corresponding mobile devices (e.g., mobile devices 140.1 and 140.2)—such as corresponding IP addresses, phone numbers, email addresses, International Mobile Station Equipment Identities (IMEI), International mobile subscriber identities (IMSI), media access control (MAC) addresses, usernames, login information, and/or any other identification information as would be understood by one of ordinary skill in the relevant art(s). In an exemplary embodiment, the base station 120.1 and/or the base station 120.2 can access one or more IP routing tables stored within the server 113. The base station 120.1 and/or the base station 120.2 can create one or more IP routing tables that are locally stored in the base station 120.1 and/or the base station 120.2, which may be based off of information within the IP routing tables stored in the server 113.

After step 745, the method of flowchart 702 transitions to step 750, where the mobile device 140.1 is configured to communicate with the mobile device 140.2 via the Xn interface communicatively coupling the base station 120.1 to the base station 120.2, and bypassing the core network. In operation, the base station 120.1 can identify communications received from the mobile device 140.1 based on the destination IP address associated with the received communications. The base station 120.1 can be configured to route the communications associated with the IP address assigned to the mobile device 140.2 via the Xn interface to the base station 120.2, bypassing the core network. Upon receipt of the communications, the base station 120.2 can identify that the data is intended for mobile device 120.2. Based on this identification, the base station 120.2 can map the communications to the second ProSe relay bearer for transmission to the mobile device 120.2. A similar process can be performed for communications received from the mobile device 120.2 by the base station 120.2 that include the IP address associated with the mobile device 120.1. In an exemplary embodiment, the base stations 120.1 and/or 120.2 can be configured to utilize IP routing tables to identify mobile devices 140 based on their corresponding IP addresses.

Figure 8A:
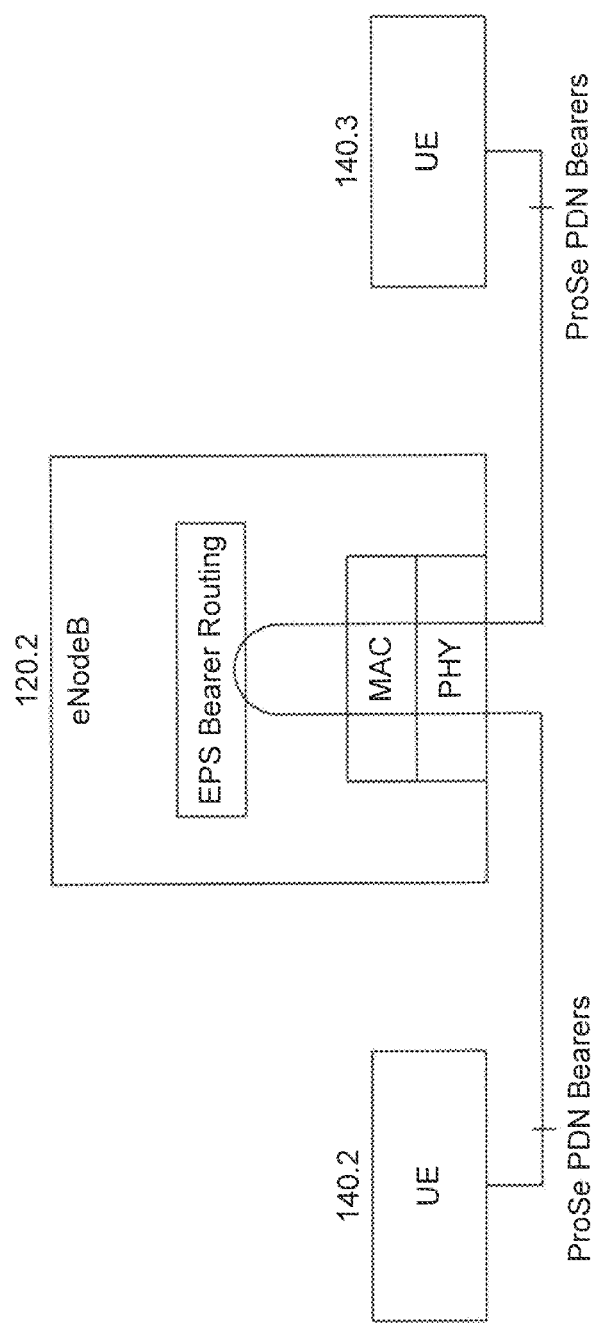
FIG. 8A illustrates an intra-base station relay architecture according to an exemplary embodiment of the present disclosure.

FIG. 8A illustrates an intra-base station relay architecture 800 according to an exemplary embodiment of the present disclosure. In an exemplary embodiment, the mobile device 140.2 and the mobile device 140.3 are within serving cell or sector 110.2 and served by the base station 120.2. The base station 120.2 is communicatively coupled to the core network via the switch 107. In operation, the intra-base station routing architecture 800 facilitates the routing of communications between the mobile device 140.2 and the mobile device 140.3 via the base station 120.2 configured as an intra-base station relay. That is, the base station 120.2 is configured as an intra-base station relay to route communications between two or more mobile devices served by the base station 120.2, without accessing the core network. In an exemplary embodiment, the base station 120.2 is configured to process one or more uplink communications from one or more of the mobile devices 140 being served by the mobile device 120.2 and determine that the intended destination of the uplink communications is one or more other mobile devices 140 being served by the mobile device 120.2. In this example, the base station 120.2 can be configured to determine the destination mobile device(s) 140 without utilizing the core network. Based on the determination, the base station 120.2 can be configured to route the communications to the destination mobile device(s) 140.

In an exemplary embodiment, the base station 120.2 can be configured to generate and/or utilize IP routing tables that include the IP addresses associated with the mobile device(s) within the serving cell or sector 110.2 and served by the base station 120.2. In an exemplary embodiment, the IP routing tables can be stored in a memory within the base station 120.2. The IP routing tables can include (but are not limited to), for example, identification information of the corresponding mobile devices (e.g., mobile devices 140.2 and 140.2)—such as corresponding IP addresses, phone numbers, email addresses, International Mobile Station Equipment Identities (IMEI), International mobile subscriber identities (IMSI), media access control (MAC) addresses, usernames, login information, and/or any other identification information as would be understood by one of ordinary skill in the relevant art(s).

In an exemplary embodiment, the base station 120.2 functioning as an intra-base station relay can utilize EPS bearer routing. For example, communications with the mobile device 140.2 can utilize a first EPS bearer and communications with the mobile device 140.3 can utilize a second EPS bearer. That is, the mobile device 140.2 can be configured to create a first EPS bearer for communications to/from the base station 120.2 (e.g., a first ProSe relay bearer) and the mobile device 140.3 can be configured to create a second EPS bearer for communications to/from the base station 120.2 (e.g., a second ProSe relay bearer). In operation, the mobile device 140.2 creates the first ProSe relay bearer for communications with base station 120.2 on a packet data network (PDN) established between the mobile device 140.2 and base station 120.2, while the mobile device 140.3 creates the second ProSe relay bearer for communications with base station 120.2 on another packet data network (PDN) established between the mobile device 140.3 and base station 120.2. Alternatively, the mobile devices 140.2 and 140.3 can be configured to utilize a shared PDN.

In operation, the base station 120.2 can be configured to map communications received from the mobile device 140.2 on the first ProSe relay bearer having a destination IP address corresponding to the mobile device 140.3 to the second ProSe relay bearer and to transmit the communications utilizing the second ProSe relay bearer to the mobile device 140.3. A similar process can be performed by the base station 120.2 for communications received from the mobile device 140.3 on the second ProSe relay bearer that are intended for the mobile device 140.2. An exemplary operation of the mobile device-to-network relay architecture 500 is discussed in more detail with reference to FIG. 8B.

Figure 8B:
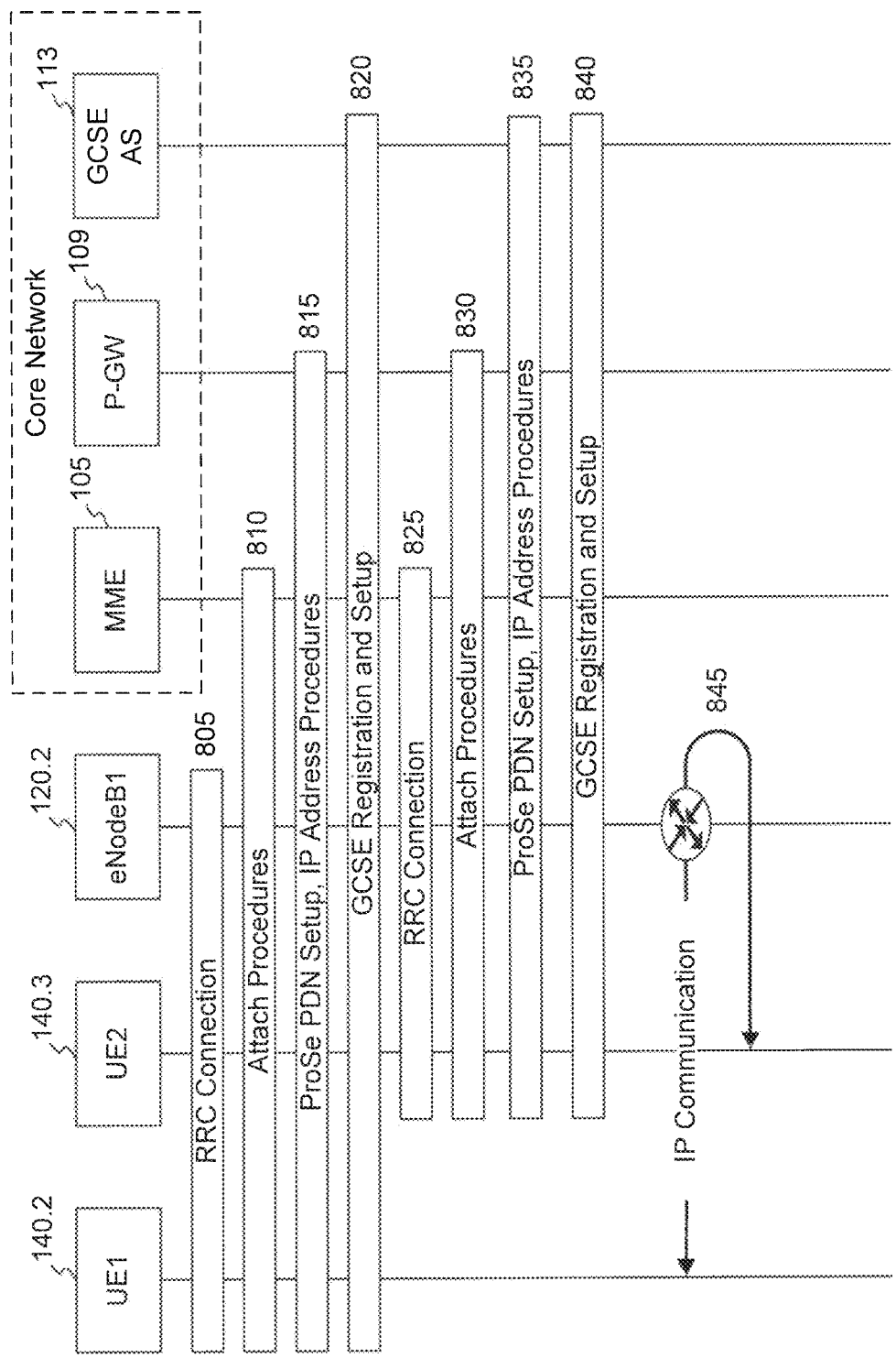
FIG. 8B illustrates a flowchart of an intra-base station relay method according to an exemplary embodiment of the present disclosure.

FIG. 8B illustrates a flowchart 802 of an intra-base station relay method according to an exemplary embodiment of the present disclosure. The method of flowchart 802 is described with continued reference to one or more of FIGS. 1-8A. The steps of the method of flowchart 802 are not limited to the order described below, and the various steps may be performed in a different order. Further, two or more steps of the method of flowchart 802 may be performed simultaneously with each other.

The method of flowchart 802 begins at step 805, where the mobile device 140.2 initiates a radio resource control (RRC) connection to the base station 120.2 by generating an RRC connection request and provides the RRC connection request to the base station 120.2. The RRC connection request can include an SAE temporary mobile subscriber identity (STMSI) and an establishment cause. The STMSI includes information used by the base station 120.2 to identify that the mobile device 140.2 is registered with MME 105. In response to the RRC connection request, the base station 120.2 generates and provides an RRC connection setup message to the mobile device 140.2. The RRC connection setup message informs the mobile device 140.2 that it now has an active connection and the mobile device 140.2 is operating in a connected mode.

After step 805, the method of flowchart 802 transitions to step 810, where the mobile device 140.2 is configured to attach to the base station 120.2 and the MME 105. The attachment of the mobile device 140.2 to the base station 120.2 and the MME 105 associates the mobile device 140.2 with the base station 120.2 and the MME 105. In an exemplary embodiment, the mobile device 140.2 is configured to generate and provide an RRC connection setup complete message to the base station 120.2 to acknowledge the RRC connection setup message. The RRC connection setup complete message can include a service request clause, which is forwarded to the MME 105 by the base station 120.2. The receipt of the service request clause by the MME 105 completes the association of the mobile device 140.2 with the MME 105.

After step 810, the method of flowchart 802 transitions to step 815, where the mobile device 140.2 performs a ProSe discovery procedure to determine if the base station 120.2 is configured to offer proximity services, such as the ability to function as an intra-base station relay. In an exemplary embodiment, the mobile device 140.2 can be configured to generate and provide a ProSe request to the base station

120.2. The mobile device 140.2 can also be configured to create a ProSe bearer. In response to the ProSe request, the base station 120.2 can be configured to perform a proximity services (ProSe) packet data network (PDN) connection procedure to enable the base station 120.2 to operate as an intra-base station relay. The PDN connection procedure creates a ProSe packet data network (PDN) to facilitate communication between the mobile device 140.2. In an exemplary embodiment, the base station 120.2 generates a ProSe PDN connection request and provides the request to the gateway 109. In response to the request, the gateway 109 generates and provides a ProSe PDN connection acknowledgement message to the mobile device 140.2 via the base station 120.2. The ProSe PDN connection acknowledgement message can include the IP address assigned to the mobile device 140.2 to facilitate the exchange of communications via the intra-base station relay. In an exemplary embodiment, the base station 120.2 is configured to store the assigned IP address and the association of the IP address with the mobile device 140.2. In an exemplary embodiment, the base station 120.2 can utilize IP routing tables that include the IP address associated with the mobile device 120.2. The IP routing tables can include (but are not limited to), for example, identification information of the corresponding mobile devices (e.g., mobile devices 140.2 and 140.2)—such as corresponding IP addresses, phone numbers, email addresses, International Mobile Station Equipment Identities (IMEI), International mobile subscriber identities (IMSI), media access control (MAC) addresses, usernames, login information, and/or any other identification information as would be understood by one of ordinary skill in the relevant art(s).

After step 815, the method of flowchart 802 transitions to step 820, where the mobile device 140.2 is configured to register with the core network to facilitate communication with the core network via the base station 120.2. In an exemplary embodiment, the registration can include group communication system enablers (GCSE) registration. In an exemplary embodiment, the mobile device 140.2 registers with server 113 to provide the server 113 with ProSe information, including, for example, the IP address that has been assigned to the mobile device 140.2. In operation, the server 113 can be configured to store and manage ProSe information for one or more mobile devices 140 that have established communications with the core network via one or more of the proximity services (e.g., intra-base station relay).

After step 820, the method of flowchart 802 transitions to step 825, where the mobile device 140.3 initiates a radio resource control (RRC) connection to the base station 120.2 by generating an RRC connection request and provides the RRC connection request to the base station 120.2. The RRC connection request can include an SAE temporary mobile subscriber identity (STMSI) and an establishment cause. The STMSI includes information used by the base station 120.2 to identify that the mobile device 140.3 is registered with MME 105. In response to the RRC connection request, the base station 120.2 generates and provides an RRC connection setup message to the mobile device 140.3. The RRC connection setup message informs the mobile device 140.3 that it now has an active connection and the mobile device 140.3 is operating in a connected mode.

After step 825, the method of flowchart 800 transitions to step 830, where the mobile device 140.3 is configured to attach to the base station 120.2 and the MME 105. The attachment of the mobile device 140.3 to the base station 120.2 and the MME 105 associates the mobile device 140.3 with the base station 120.2 and the MME 105. In an exemplary embodiment, the mobile device 140.3 is configured to generate and provide an RRC connection setup complete message to the base station 120.2 to acknowledge the RRC connection setup message. The RRC connection setup complete message can include a service request clause, which is forwarded to the MME 105 by the base station 120.2. The receipt of the service request clause by the MME 105 completes the association of the mobile device 140.3 with the MME 105.

After step 830, the method of flowchart 802 transitions to step 835, where the mobile device 140.3 performs a ProSe discovery procedure to determine if the base station 120.2 is configured to offer proximity services, such as the ability to function as an intra-base station relay. In an exemplary embodiment, the mobile device 140.3 can be configured to generate and provide a ProSe request to the base station 120.2. The mobile device 140.3 can also be configured to create a ProSe bearer. In response to the ProSe request, the base station 120.2 can be configured to perform a proximity services (ProSe) packet data network (PDN) connection procedure to enable the base station 120.2 to operate as an intra-base station relay. The PDN connection procedure creates a ProSe packet data network (PDN) to facilitate communication between the mobile device 140.3. In an exemplary embodiment, the base station 120.2 generates a ProSe PDN connection request and provides the request to the gateway 109. In response to the request, the gateway 109 generates and provides a ProSe PDN connection acknowledgement message to the mobile device 140.3 via the base station 120.2. The ProSe PDN connection acknowledgement message can include the IP address assigned to the mobile device 140.3 to facilitate the exchange of communications via the intra-base station relay. In an exemplary embodiment, the base station 120.2 is configured to store the assigned IP address and the association of the IP address with the mobile device 140.3. In an exemplary embodiment, the base station 120.2 can be configured to generate and/or utilize IP routing tables that include the IP address associated with the mobile device 120.2. The IP routing tables can include (but are not limited to), for example, identification information of the corresponding mobile devices (e.g., mobile devices 140.2 and 140.2)—such as corresponding IP addresses, phone numbers, email addresses, International Mobile Station Equipment Identities (IMEI), International mobile subscriber identities (IMSI), media access control (MAC) addresses, usernames, login information, and/or any other identification information as would be understood by one of ordinary skill in the relevant art(s).

After step 835, the method of flowchart 802 transitions to step 840, where the mobile device 140.3 is configured to register with the core network to facilitate communication with the core network via the base station 120.2. In an exemplary embodiment, the registration can include group communication system enablers (GCSE) registration. In an exemplary embodiment, the mobile device 140.3 registers with server 113 to provide the server 113 with ProSe information, including, for example, the IP address that has been assigned to the mobile device 140.3. In operation, the server 113 can be configured to store and manage ProSe information for one or more mobile devices 140 that have established communications with the core network via one or more of the proximity services (e.g., intra-base station relay).

After step 840, the method of flowchart 802 transitions to step 845, where the mobile device 140.2 is configured to communicate with the mobile device 140.3 via the base station 120.2 configured as an intra-base station relay.

In operation, the base station 120.2 is configured to process one or more uplink communications from, for example, mobile device 140.2 and determine that the intended destination of the uplink communications is mobile devices 140.3. For example, the base station 120.2 can be configured to utilize a first EPS bearer for communications with mobile device 140.2 and can utilize a second EPS bearer for communications with the mobile device 140.3. In operation, the mobile device 140.2 creates the first ProSe relay bearer for communications with base station 120.2 on a packet data network (PDN) established between the mobile device 140.2 and base station 120.2, while the mobile device 140.3 creates the second ProSe relay bearer for communications with base station 120.2 on another packet data network (PDN) established between the mobile device 140.3 and base station 120.2. Alternatively, the mobile devices 140.2 and 140.3 can utilize the same PDN.

In an exemplary embodiment, the base station 120.2 can be configured to map communications received from the mobile device 140.2 on the first ProSe relay bearer having a destination IP address corresponding to the mobile device 140.3 to the second ProSe relay bearer, and to transmit the communications utilizing the second ProSe relay bearer to the mobile device 140.3. A similar process can be performed by the base station 120.2 for communications received from the mobile device 140.3 on the second ProSe relay bearer that are intended for the mobile device 140.2. In an exemplary embodiment, the base stations 120.2 can be configured to generate and/or utilize one or more IP routing tables to identify destination mobile devices and to map the communications to the appropriate mobile device 140 based on the IP routing table(s). In an exemplary embodiment, the base station 120.2 is configured to map communications to corresponding ProSe relay bearers without utilizing core network resources.

CONCLUSION

The aforementioned description of the specific embodiments will so fully reveal the general nature of the disclosure that others can, by applying knowledge within the skill of the art, readily modify and/or adapt for various applications such specific embodiments, without undue experimentation, without departing from the general concept of the present disclosure. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

References in the specification to "one embodiment," "an embodiment," "an exemplary embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The exemplary embodiments described herein are provided for illustrative purposes, and are not limiting. Other exemplary embodiments are possible, and modifications may be made to the exemplary embodiments within the spirit and scope of the disclosure. Therefore, the specification is not meant to limit the disclosure. Rather, the scope of the disclosure is defined only in accordance with the following claims and their equivalents.

Embodiments may be implemented in hardware (e.g., circuits), firmware, software, or any combination thereof. Embodiments may also be implemented as instructions stored on a machine-readable medium, which may be read and executed by one or more processors. A machine-readable medium may include any mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others. Further, firmware, software, routines, instructions may be described herein as performing certain actions. However, it should be appreciated that such descriptions are merely for convenience and that such actions in fact result from computing devices, processors, controllers, or other devices executing the firmware, software, routines, instructions, etc. Further, any of the implementation variations may be carried out by a general purpose computer.

In embodiments having one or more components that include one or more processors, one or more of the processors can include (and/or be configured to access) one or more internal and/or external memories that store instructions and/or code that, when executed by the processor(s), cause the processor(s) to perform one or more functions and/or operations related to the operation of the corresponding component(s) as described herein and/or as would appreciated by those skilled in the relevant art(s).

It is to be appreciated that the Detailed Description section, and not the Summary and Abstract sections, is intended to be used to interpret the claims. The Summary and Abstract sections may set forth one or more but not all exemplary embodiments of the present disclosure as contemplated by the inventors, and thus, are not intended to limit the present disclosure and the appended claims in any way.

The present disclosure has been described above with the aid of functional building blocks illustrating the implementation of specified functions and relationships thereof. The boundaries of these functional building blocks have been arbitrarily defined herein for the convenience of the description. Alternate boundaries may be defined so long as the specified functions and relationships thereof are appropriately performed.

What is claimed is:

1. A communication device, comprising:
   a transceiver configured to communicate with a base station and a mobile device; and
   processor circuitry communicatively coupled to the transceiver, the processor circuitry configured to:
   receive a proximity service (ProSe) request message from the mobile device using the transceiver;
   determine identification information associated with the mobile device;
   generate a ProSe request acknowledgment message based on the ProSe request message, the ProSe request acknowledgment message including the identification information;

transmit the ProSe request acknowledgment message to the mobile device using the transceiver; and receive a communication from the mobile device using the transceiver and route the communication to the base station based on the identification information.

2. The communication device of claim 1, wherein the processor circuitry is further configured to:

transmit, using the transceiver, the identification information to a core network via the base station to register the mobile device with the core network.

3. The communication device of claim 1, wherein the processor circuitry is further configured to:

establish a ProSe packet data network (PDN) based on the ProSe request message, the ProSe PDN being associated with the mobile device, and route the communication from the mobile device to the base station via the ProSe PDN.

4. The communication device of claim 1, wherein the identification information includes an internet protocol (IP) address.

5. The communication device of claim 1, wherein the processor circuitry is further configured to route the communication using Layer 3 routing or internet protocol (IP) routing.

6. The communication device of claim 1, wherein the transceiver is further configured to communicate with a second mobile device; and wherein the processor circuitry is configured to:
receive a second communication from the second mobile device using the transceiver; and
route the second communication to the base station.

7. The communication device of claim 3, wherein the transceiver is further configured to communicate with a second mobile device; and wherein the processor circuitry is configured to
receive a second communication from the second mobile device using the transceiver; and
route the second communication to the base station via the ProSe PDN.

8. The communication device of claim 7, wherein the processor circuitry is further configured to:

route the second communication to the base station via the ProSe PDN using internet protocol (IP) routing.

9. The communication device of claim 3, wherein the transceiver is further configured to communicate with a second mobile device; and wherein the processor circuitry is configured to:
establish a second ProSe PDN, the second ProSe PDN being associated with the second mobile device;
receive a second communication from the second mobile device using the transceiver; and
route the second communication to the base station via the second ProSe PDN.

10. The communication device of claim 9, wherein the processor circuitry is further configured to:

route the second communication to the base station via the second ProSe PDN using Layer 3 routing.

11. The communication device of claim 1, wherein the transceiver is further configured to communicate with a second mobile device; and wherein the processor circuitry is configured to:
receive a second communication from the second mobile device using the transceiver; and
perform device-to-device relaying to route the second communication to the mobile device.

12. A communication device, comprising:

a transceiver configured to communicate with a base station and first and second mobile devices; and processor circuitry communicatively coupled to the transceiver, the processor circuitry configured to:
generate a bearer to route communications between the communication device and the base station;
generate a proximity service (ProSe) relay bearer supporting one or more communications between the communication device and the first and the second mobile devices;
assign first identification information to the first mobile device; and
route one or more communications between the base station and the first mobile device via the ProSe relay bearer based on the first identification information.

13. The communication device of claim 12, wherein the first identification information is a first Internet protocol (IP) address.

14. The communication device of claim 13, wherein the processor circuitry is further configured to:

route the one or more communications between the base station and the first mobile device using an IP routing table.

15. The communication device of claim 12, wherein the processor circuitry is further configured to:

assign second identification information to the second mobile device; and
route one or more communications between the base station and the second mobile device via the ProSe relay bearer based on the second identification information.

16. The communication device of claim 15, wherein the second identification information is a second IP address.

17. The communication device of claim 16, wherein the processor circuitry is further configured to:

route the one or more communications between the base station and the second mobile device using an IP routing table.

18. The communication device of claim 12, wherein the processor circuitry is further configured to generate another bearer configured to support one or more communications between the communication device and a third mobile device.

19. A communication system, comprising:

a first base station (BS), including:
a first transceiver configured to communicate with a first mobile device; and
first processor circuitry communicatively coupled to the first transceiver, the first processor circuitry configured to:
receive a first proximity service (ProSe) request message from the first mobile device using the transceiver;
generate a first ProSe request acknowledgment message based on the ProSe request message, the first ProSe request acknowledgment message including first identification information corresponding to the first mobile device;
transmit the first ProSe request acknowledgment message to the first mobile device;
establish a BS-to-BS relay configured to communicatively couple the first BS to a second BS;
receive a communication from the first mobile device using the first transceiver, the communication including a second identification information corresponding to a second mobile device, and route the communication to the second BS station via the BS-to-BS relay based on the second identification information.

20. The communication system of claim 19, wherein the first transceiver is further configured to communicate with a third mobile device; and
 wherein the first processor circuitry is configured to route another communication from the third mobile device to the first mobile device based on the first identification information.

* * * * *

UNITED STATES PATENT AND TRADEMARK OFFICE
CERTIFICATE OF CORRECTION

PATENT NO. : 9,602,959 B2
APPLICATION NO. : 14/321567
DATED : March 21, 2017
INVENTOR(S) : Kalapatapu et al.

Page 1 of 1

It is certified that error appears in the above-identified patent and that said Letters Patent is hereby corrected as shown below:

In the Claims

In Column 37, Line 37, replace "to" with --to:--.

In Column 38, Line 18, replace "Internet" with --internet--.

Signed and Sealed this
Fourth Day of June, 2019

Andrei Iancu
*Director of the United States Patent and Trademark Office*